(12) United States Patent
Jarosz et al.

(10) Patent No.: US 8,638,331 B1
(45) Date of Patent: Jan. 28, 2014

(54) IMAGE PROCESSING USING ITERATIVE GENERATION OF INTERMEDIATE IMAGES USING PHOTON BEAMS OF VARYING PARAMETERS

(75) Inventors: Wojciech Jarosz, Zürich (CH); Derek Nowrouzezahrai, Zürich (CH); Robert Thomas, Lake Forest, CA (US); Peter-Pike Sloan, Salt Lake City, UT (US); Matthias Zwicker, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 126 days.

(21) Appl. No.: 13/235,299

(22) Filed: Sep. 16, 2011

(51) Int. Cl.
*G06T 15/50* (2011.01)
*G06T 15/60* (2006.01)

(52) U.S. Cl.
USPC .......................................................... 345/426

(58) Field of Classification Search
USPC .......................................................... 345/419
See application file for complete search history.

(56) References Cited

PUBLICATIONS

Jarosz, Wojciech, Matthias Zwicker, and Henrik Wann Jensen. "The beam radiance estimate for volumetric photon mapping." ACM SIGGRAPH 2008 classes. ACM, 2008.*
Hachisuka, Toshiya, Shinji Ogaki, and Henrik Wann Jensen. "Progressive photon mapping." ACM Transactions on Graphics (TOG). vol. 27. No. 5. ACM, 2008.*
Lokovic, Tom, and Eric Veach. "Deep shadow maps." Proceedings of the 27th annual conference on Computer graphics and interactive techniques. ACM Press/Addison-Wesley Publishing Co., 2000.*
Herzog, Robert, et al. "Global illumination using photon ray splatting." Computer Graphics Forum. vol. 26. No. 3. Blackwell Publishing Ltd, 2007.*
Hachisuka, Toshiya, Wojciech Jarosz, and Henrik Wann Jensen. "Stochastic Progressive Photon Mapping" ACM Transactions on Graphics (TOG) (Dec. 2009).*
Engelhardt, T., Novak, J., and Dachsbachfr, C., "Instant multiple scattering for interactive rendering of heterogeneous participating media." *Technical Report*. Karlsruhe Institute of Technology, Dec. 8, 2010. 9 pages. Retrieved from http://cg.ibds.kit.edu/downloads/InstantMultipleScattering_TechReport08Dec2010.pdf on Aug. 20, 2013.
Hachisuka, T., and Jensen, H. W. "Stochastic progressive photon mapping.". *ACM Transactions on Graphics*, Dec. 2009. 8 pages. Retrieved from http://cs.au.dk/~toshiya/sppm.pdf on Aug. 20, 2013.
Hachisuka, T., Ogaki, S., and Jensen, H. W. "Progressive photon mapping." *ACM Transactions on Graphics*, Dec. 2008. 7 pages. Retrieved from http://cs.au.dk/~toshiya/ppm.pdf on Aug. 20, 2013.

(Continued)

*Primary Examiner* — Aaron M Richer
*Assistant Examiner* — Vu Nguyen
(74) *Attorney, Agent, or Firm* — Kilpatrick Townsend & Stockton LLP

(57) ABSTRACT

A method and system for progressively rendering radiance for a volumetric medium is provided. A photon simulation produces a representation of photon beams in a scene. The photon beams are rendered with respect to a camera viewpoint, by computing an estimated radiance associated with the photon beams. A global radius scaling factor is applied to the photon beams. Over multiple iterations of these steps, the global radius scaling factor is progressively decreased, thereby reducing overall error by facilitating convergence. This order can be mixed up. Finally, the renderer can be efficiently implemented on the GPU as a splatting operation, for use in interactive and real-time applications.

30 Claims, 8 Drawing Sheets

(56) References Cited

PUBLICATIONS

Havran, V., Bittner, J., Herzog, R., and Seidel, H.-P. "Ray maps for global illumination." *Rendering Techniques*, 2005. 14 pages. Retrieved from http://www.mpi-inf.mpg.de/~rherzog/Papers/raymapsEGSR05.pdf on Aug. 20, 2013.

Herzog, R., Havran, V., Kinuwaki, S., Myszkowski, K., and Seidel, H.-P. "Global illumination using photon ray splatting." *Computer Graphics Forum* vol. 26, No. 3, Sep. 2007. 11 pages. Retrieved from http://www.mpi-inf.mpg.de/~rherzog/Papers/herzog07EG.pdf on Aug. 20, 2013.

Hu, W., Dong, Z., Ihrke, I., Grosch, T., Yuan, G., and Seidel, H.-P. "Interactive volume caustics in single-scattering media." *I3D, ACM*. 2010. 9 pages. Retrieved from http://www.graphics.cornell.edu/~zd/download/I3DFinal/I3D2010_Sub.pdf on Aug. 20, 2013.

Jarosz, W., Zwicker, M., and Jensen, H. W. "The beam radiance estimate for volumetric photon mapping." *Computer Graphics Forum* vol. 27, No. 2, Apr. 2008. 10 pages. Retrieved from http://zurich.disneyresearch.com/~wjarosz/publications/jarosz08beam.pdf on Aug. 20, 2013.

Jarosz, W., Nowrouzezahrai, D., Sadeghi, I., and Jensen, H. W. "A comprehensive theory of volumetric radiance estimation using photon points and beams." *ACM Transactions on Graphics*, 2011. 19 pages. Retrieved from http://zurich.disneyresearch.com/~wjarosz/publications/jaroz11comprehensive.pdf on Aug. 20, 2013.

Jensen, H. W., and Christensen, P. H. "Efficient simulation of light transport in scenes with participating media using photon maps." *Proceedings of SIGGRAPH*, 1998. 10 pages. Retrieved from http://citeseerx.ist.psu.edu/viewdoc/download?doi=10.1.1.118.6575&rep=rep1&type=pdf on Aug. 20, 2013.

Kajiya, J. T. "The rendering equation." *Computer Graphics, Proceedings of SIGGRAPH* 86,1986. 8 pages. Retrieved from http://x86.cs.duke.edu/courses/cps124/compsci344/.../16...p143- kajiya.pdf on Aug. 20, 2013.

Knaus, C., and Zwicker, M. "Progressive photon mapping: A probabilistic approach." *ACM Transactions on Graphics*, 2011. 14 pages. Retrieved from http://www.cs.jhu.edu/~misha/ReadingSeminar/Papers/Knaus11.pdf on Aug. 20, 2013.

Kruger, J., Burger, K., and Westermann, R. "Interactive screen-space accurate photon tracing on GPUs." In *Rendering Techniques*. 2006. 12 pages. Retrieved from http://wwwcg.in.tum.de/research/research/publications/2006/interactive-screen-space-accurate-photon-tracing-on-gpus.html on Aug. 20, 2013.

Lafortune, E. P., and Willems, Y. D. "Bi-directional path tracing." *Proceedings of Compugraphics*, vol. 93. 1993. 8 pages.

Lafortune, E. P., and Willems, Y. D. "Rendering participating media with bidirectional path tracing." *EG Rendering Workshop*. 1996. 11 pages. Retrieved from http://luthuli.cs.uiuc.edu/~daf/courses/Rendering/Papers/lafortune96rendering.pdf on Aug. 20, 2013.

Lastra, M., Urena, C., Revelles, J., and Montes, R. "A particle-path based method for Monte-Carlo density estimation." *EG Workshop on Rendering*. 2002. 8 pages. Retrieved from http://lsi.ugr.es/~curena/inves/egrw02/lastra-egrw02.ps.gz on Aug. 20, 2013.

Liktor, G., and Dachsbacher, C. "Real-time volume caustics with adaptive beam tracing." *Symposium on Interactive 3D Graphics and Games*. ACM Press. New York, NY. 2011. 8 pages. Retrieved from http://cg.ibds.kit.edu/downloads/VolumeCaustics_Preprint.pdf on Aug. 20, 2013.

Lokovic, T., and Veach, E. "Deep shadow maps." *SIG-GRAPH*, ACM Press. New York, NY. 2000. 8 pages. Retrieved from http://graphics.stanford.edu/papers/deepshadows/deepshad.pdf on Aug 20, 2013.

McGuire, M., and Luebke, D. "Hardware-accelerated global illumination by image space photon mapping." *HPG, ACM*. 2009. 12 pages. Retrieved from http://graphics.cs.williams.edu/papers/PhotonHPG09/ISPM-HPG09.pdf on Aug. 20, 2013.

Parker, S. G., Bigler, J., Dietrich, A., Friedrich, H., Hoberock, J., Luebke, D., McAllister, D., McGuire, M., Morley, K., Robison, A., and Stich, M. "Optix: A general purpose ray tracing engine." *ACM Transactions on Graphics*. Jul. 2010. Retrieved from http://graphics.cs.williams.edu/papers/OptiXSIGGRAPH10/Parker10OptiX.pdf on Aug. 20, 2013.

Pauly, M., Kollig, T., and Keller, A. "Metropolis light transport for participating media." *Rendering Techniques*. 2000. 13 pages. Retrieved from http://www.cse.ohio-state.edu/~parent/classes/782/Papers/PhotonMap/metropolis.pdf on Aug. 20, 2013.

Perlin, K. "Noise hardware." *Real-time Shading, ACM SIG-GRAPH Course Notes*. 2001. 26 pages. Retrieved from http://reality.sgiweb.org/olano/s2002c36/ch02.pdf on Aug. 20, 2013.

Raab, M., Seibert, D and Keller, A. "Unbiased global illumination with participating media." *Monte Carlo and Quasi-Monte Carlo Methods*. 2006. 16 pages. Retrieved from http://www.uni-ulm.de/fileadmin/website_uni_ulm/iui.inst.100/institut/Papers/ugiwpm.pdf on Aug. 20, 2013.

Schjoth, L., Frisvad, J. R., Erleben, K., and Sporring, J. "Photon differentials." *GRAPHITE*, ACM, New York. 2007. 8 pages. Retrieved from http://orbit.dtu.dk/fedora/objects/orbit:63065/datastreams/file_5504929/content on Aug. 20, 2013.

Sun, X., Zhou, K., Lin, S., and Guo, B. "Line space gathering for single scattering in large scenes." *ACM Transactions on Graphics*. 2010. 8 pages. Retrieved from http://www.kunzhou.net/2010/LSG.pdf on Aug. 20, 2013.

Szirmay-Kalos, L., Toth, B., and Magdics, M. "Free path sampling in high resolution inhomogeneous participating media." *Computer Graphics Forum*. 2011. 12 pages. Retrieved from http://sirkan.iit.bme.hu/~szirmay/woodcockperlin7.pdf Aug. 20, 2013.

Veach, E., and Guibas, L. "Bidirectional estimators for light transport." *Fifth Eurographics Workshop on Rendering*. 1994. 20 pages. Retrieved from http://www0.cs.ucl.ac.uk/research/vr/Projects/VLF/vlfpapers/multi-pass_hybrid/Veach_E_Bi-directional_Estimators_for_Light_Transport.pdf on Aug. 20, 2013.

Veach, E., and Guibas, L. J. "Metropolis light transport." *Proceedings of SIGGRAPH 97, Computer Graphics Proceedings*, Annual Conference Series. 1997. 13 pages. Retrieved from http://citeseerx.ist.psu.edu/viewdoc/download?doi=10.1.1.88.944&rep=rep1&type on Aug. 20, 2013.

Walter, B., Zhao, S., Holzschuch, N., and Bala, K. "Single scattering in refractive media with triangle mesh boundaries." *ACM Transactions on Graphics* 28, 3, 92:1-92:8. Jul. 2009. 7 pages. Retrieved from http://shuangz.com/projects/amber-sg09/amber.pdf on Aug. 20, 2013.

Williams, L. "Casting curved shadows on curved surfaces." *Computer Graphics, Proceedings of SIGGRAPH* 78. 1978. 5 pages. Retrieved from http://www.cs.berkeley.edu/~ravir/6160-fall04/papers/p270-williams.pdf on Aug. 20, 2013.

Yue, Y., Iwasaki, K., Chen, B.-Y., Dobashi, Y., and Nishita, T. "Unbiased, adaptive stochastic sampling for rendering inhomogeneous participating media." *ACM Transactions on Graphics*. 2010. 7 pages. Retrieved from http://nishitalab.org/user/egaku/sigasia10/177.pdf on Aug. 20, 2013.

* cited by examiner

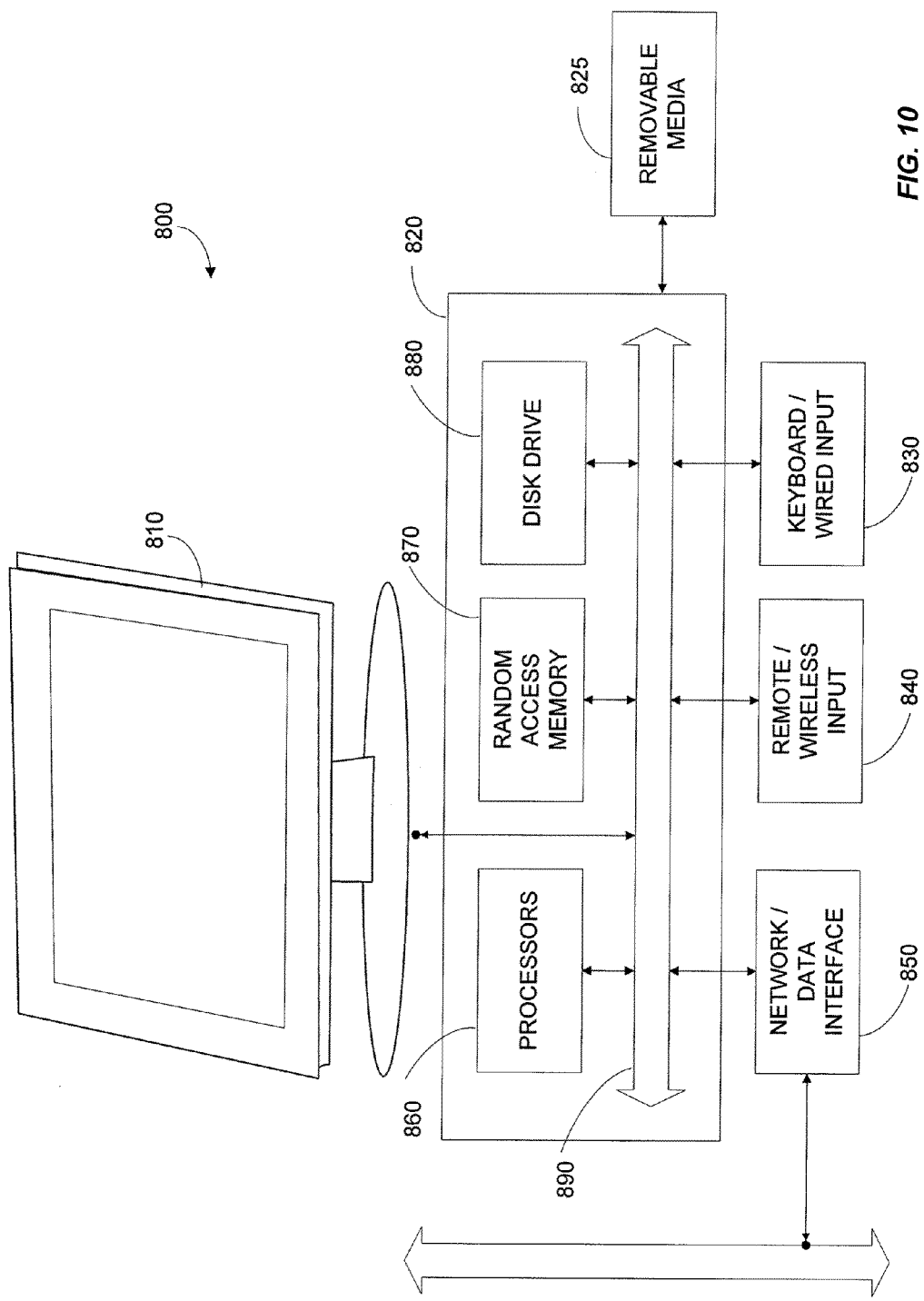

IMAGE PROCESSING USING ITERATIVE GENERATION OF INTERMEDIATE IMAGES USING PHOTON BEAMS OF VARYING PARAMETERS

BACKGROUND

Computer-generated imagery typically involves using software and/or hardware to generate one or more images from a geometric model. A geometric model defines objects, light sources, and other elements of a virtual scene and a rendering system or other computer/software/hardware system will read in the geometric model and determine what colors are needed in what portions of the image. A renderer will generate a two-dimensional ("2D") or three-dimensional ("3D") array of pixel color values that collectively result in the desired image or images.

For a simple geometric model, such as a cube in a vacuum with a single light source, a simple computer program running on most computer hardware could render the corresponding image in a reasonable amount of time without much optimization effort. However, there are many needs—in the entertainment industry and beyond—for methods and apparatus that can efficiently process complex interactions of virtual objects to generate imagery in constrained timeframes where the images might need to convey realistic light interactions, such as light interacting with a participating medium.

Examples of such interaction include the scattering of light, which results in visual complexity, such as when the light interacts with participating media such as clouds, fog, and even air. Rendering this complex light transport typically involves solving a radiative transport equation [Chandrasekar 1960] combined with a rendering equation [Kajiya 1986] as a boundary condition. Other light interactions might include light passing through objects, such as refractive objects.

Rendering preferably involves computing unbiased, noise-free images. Unfortunately, the typical options to achieve this are variants of brute force path tracing [Kajiya 1986; Lafortune and Willems 1993; Veach and Guibas 1994; Lafortune and Willems 1996] and Metropolis light transport [Veach and Guibas 1997; Pauly et al. 2000], which are notoriously slow to converge to noise-free images despite recent advances [Raab et al. 2008; Yue et al. 2010]. This becomes particularly problematic when the scene contains so-called specular-diffuse-specular ("SDS") subpaths or specular-media-specular ("SMS") subpaths, which are actually quite common in physical scenes (e.g., illumination due to a light source inside a glass fixture). Unfortunately, path tracing methods cannot robustly handle these situations, especially in the presence of small light sources.

Methods based on volumetric photon mapping [Jensen and Christensen 1998] do not suffer from these problems. They can robustly handle SDS and SMS subpaths, and generally produce less noise. However, these methods suffer from bias. Bias can be eliminated, in theory, by using infinitely many photons, but in practice this is not feasible since tracking infinitely many photons requires unlimited memory.

Volumetric photon mapping is an approach to dealing with light in a participating medium. It is described in [Jensen and Christensen 1998] and subsequently improved by [Jarosz et al. 2008] to avoid costly and redundant density queries due to ray marching. In those approaches, a renderer formulates a "beam radiance estimate" that considers all photons along the length of a ray in one query. [Jarosz et al. 2011] showed how to apply the beam concept not just to the query operation but also to the photon data representation. In that approach, the entire photon path is used instead of just photon points, to obtain significant quality and performance improvement. This is similar in spirit to the concept of ray maps for surface illumination [Lastra et al. 2002; Havran et al. 2005; Herzog et al. 2007] as well as the recent line-space gathering technique [Sun et al. 2010]. These methods result in bias, which allows for more efficient simulation; however, when the majority of the illumination is due to caustics (which is often the case with realistic lighting fixtures or when there are specular surfaces), the photons are visualized directly and a large number is required to obtain high-quality results. Though these methods converge to an exact solution as the number of photons increases, obtaining a converged solution requires storing an infinite collection of photons, which is not feasible.

Progressive photon mapping [Hachisuka et al. 2008] alleviates this memory constraint. Instead of storing all photons needed to obtain a converged result, it updates progressive estimates of radiance at measurement points in the scene [Hachisuka et al. 2008; Hachisuka and Jensen 2009] or on the image plane [Knaus and Zwicker 2011]. Photons are traced and discarded progressively, and the radiance estimates are updated after each photon tracing pass in such a way that the approximation converges to the correct solution in the limit.

Previous progressive techniques have primarily focused on surface illumination, but [Knaus and Zwicker 2011] demonstrated results for traditional volumetric photon mapping [Jensen and Christensen 1998]. Unfortunately, volumetric photon mapping with photon points produces inferior results to photon beams [Jarosz et al. 2011], especially in the presence of complex specular interactions that benefit most from progressive estimation.

Thus, even with those techniques, there was room for improvement.

REFERENCES

AKENINE-MÖLLER, T., HAINES, E., and HOFFMAN, N. 2008. *Real-Time Rendering 3rd Edition*. A. K. Peters, Ltd., Natick, Mass., USA.

CHANDRASEKAR, S. 1960. *Radiative Transfer*. Dover Publications.

ENGELHARDT, T., NOVÁK, J., and DACHSBACHER, C. 2010. Instant multiple scattering for interactive rendering of heterogeneous participating media. Tech. Rep., Karlsruhe Institut of Technology (December).

HACHISUKA, T., and JENSEN, H. W. 2009. Stochastic progressive photon mapping. *ACM Transactions on Graphics* (December).

HACHISUKA, T., OGAKI, S., and JENSEN, H. W. 2008. Progressive photon mapping. *ACM Transactions on Graphics* (December).

HAVRAN; V. BITTNER, J., HERZOG, R., and SEIDEL, H.-P. 2005. Ray maps for global illumination. In *Rendering Techniques*, 43-54.

HERZOG, R., HAVRAN, V. KINUWAKI, S., MYSZKOWSKI, K., and SEIDEL, H.-P. 2007. Global illumination using photon ray splatting. *Computer Graphics Forum* 26, 3 (September), 503-513.

HU, W., DONG, Z., IHRKE, I., GROSCH, T., YUAN, G., and SEIDEL, H.-P. 2010. Interactive volume caustics in single-scattering media. In *I3D*, ACM.

JAROSZ, W., ZWICKER, M., and JENSEN, H. W. 2008. The beam radiance estimate for volumetric photon mapping. *Computer Graphics Forum* 27, 2 (April), 557-566.

JAROSZ, W., NOWROUZEZAHRAI, D., SADEGHI, I., and JENSEN, H. W. 2011. A comprehensive theory of volumetric radiance estimation using photon points and beams. *ACM Transactions on Graphics*.

JENSEN, H. W., and CHRISTENSEN, P. H. 1998. Efficient simulation of light transport in scenes with participating media using photon maps. In *Proceedings of SIGGRAPH*.

JENSEN, H. W. 2001, *Realistic Image Synthesis Using Photon Mapping*. A. K. Peters, Ltd., Natick, Mass., USA.

KAJIYA, J. T. 1986. The rendering equation. In *Computer Graphics (Proceedings of SIGGRAPH 86)*, 143-150.

KNAUS, C., and ZWICKER, M. 2011. Progressive photon mapping: A probabilistic approach. *ACM Transactions on Graphics*.

KRÜGER, J., BÜRGER, K., and WESTERMANN, R. 2006. Interactive screen-space accurate photon tracing on GPUs. In *Rendering Techniques*.

LAFORTUNE, E. P., and WILLEMS, Y. D. 1993. Bi-directional path tracing. In *Compugraphics*.

LAFORTUNE, E. P., and WILLEMS, Y. D. 1996. Rendering participating media with bidirectional path tracing. In *EG Rendering Workshop*.

LASTRA, M., UREÑA, C., REVELLES, J., and MONTES, R. 2002. A particle-path based method for Monte Carlo density estimation. In *EG Workshop on Rendering*, EG Association.

LIKTOR, G., and DACHSBACHER, C. 2011. Real-time volume caustics with adaptive beam tracing. In *Symposium on Interactive 3D Graphics and Games*, ACM, New York, N.Y., USA, I3D '11, 47-54.

LOKOVIC, T., and VEACH, E. 2000. Deep shadow maps. In *SIGGRAPH, ACM Press, New York, N.Y., USA,* 385-392.

MCGUIRE, M., and LUEBKE, D. 2009. Hardware-accelerated global illumination by image space photon mapping. In *HPG*, ACM.

PARKER, S. G., BIGLER, J., DIETRICH, A., FRIEDRICH, H., HOBEROCK, J., LUEBKE, D., MCALLISTER, D., MCGUIRE, M., MORLEY, K., ROBISON, A., and STICH, M. 2010. Optix: A general purpose ray tracing engine. *ACM Transactions on Graphics* (July).

PAULY, M., KOLLIG, T., and KELLER, A. 2000. Metropolis light transport for participating media. In *Rendering Techniques*, 11-22.

PERLIN, K. 2001. Noise hardware. In *Real-time Shading, ACM SIGGRAPH Course Notes*.

RAAB, M., SEIBERT, D, and KELLER, A. 2008. Unbiased global illumination with participating media. In *Monte Carlo and Quasi-Monte Carlo Methods 2006*. Springer, 591-606.

SCHJØTH, L. FRISVAD, J. R., ERLEBEN, K., and SPORRING, J. 2007. Photon differentials. In *GRAPHITE*, ACM, New York.

SILVERMAN, B. 1986. *Density Estimation for Statistics and Data Analysis*. Monographs on Statistics and Applied Probability. Chapman and Hall, New York.

SUN, X., ZHOU, K., LIN, S., and GUO, B. 2010. Line space gathering for single scattering in large scenes. *ACM Transactions on Graphics*.

SZIRMAY-KALOS, L., TÓTH, B. and MAGDICS, M. 2011. Free path sampling in high resolution inhomogeneous participating media. *Computer Graphics Forum* 30, 1, 85-97.

VEACH, E., and GUIBAS, L. 1994. Bidirectional estimators for light transport. In *Fifth Eurographics Workshop on Rendering*, 147-162.

VEACH, E., and GUIBAS, L. J. 1997. Metropolis light transport, In *Proceedings of SIGGRAPH 97*, Computer Graphics Proceedings, Annual Conference Series, 65-76.

WALTER, B., ZHAO, S., HOLZSCHUCH, N., and BALA, K. 2009. Single scattering in refractive media with triangle mesh boundaries. *ACM Transactions in Graphics* 28, 3 (July), 92:1-92:8.

WILLIAMS, L. 1978. Casting curved shadows on curved surfaces. In *Computer Graphics (Proceedings of SIGGRAPH 78)*, 270-274.

WOODCOCK, E., MURPHY, T., HEMMINGS, P., and T. C., L. 1965. Techniques used in the GEM code for Monte Carlo neutronics calculations in reactors and other systems of complex geometry. In *App. of Computing Methods to Reactor Prob.*, Argonne National Laboratory.

YUE, Y., IWASAKI, K., CHEN, B.-Y., DOBASHI, Y., and NISHITA, T. 2010. Unbiased, adaptive stochastic sampling for rendering inhomogeneous participating media. *ACM Transactions on Graphics*.

SUMMARY

A method and system for progressively rendering radiance for a volumetric medium is provided, such that computing images can be done in software and/or hardware efficiently and still represent the desired image effects. Given a geometric model of a virtual space, or another description of a scene, a process or apparatus generates an image or multiple images, in part using a photon simulation process to produce a representation of photon beams in a scene. The photon beams are rendered with respect to a camera viewpoint, iteratively, by computing an estimated radiance associated with the photon beams. Over multiple iterations, the global radius scaling factor is progressively decreased, thereby reducing overall error by facilitating convergence. Finally, a representation of the computed average estimated radiance at each pixel in the scene is stored. In each iteration, there might be different samplings of photon beams and different beam radii for different beams in the iterations. In a specific embodiment, a global radii parameter is set for each iteration so that the beams are the same radius for one iterative image and different from image to image.

In some embodiments, the process is implemented using a graphics processing unit ("GPU") and formulating the process as a splatting operation, for use in interactive and real-time applications.

In some embodiments, heterogeneous participating media is handled. One method of handling it is to use piecewise handling of the beams, including setting a termination point for the beam, as in shadow mapping. Such techniques can be expanded beyond photon beams.

BRIEF DESCRIPTION OF THE DRAWINGS

FIG. 1 illustrates example scenes rendered using an embodiment of the invention.

FIG. 10 illustrates an example of a hardware system that might be used for rendering.

DETAILED DESCRIPTION

Figure 1A:
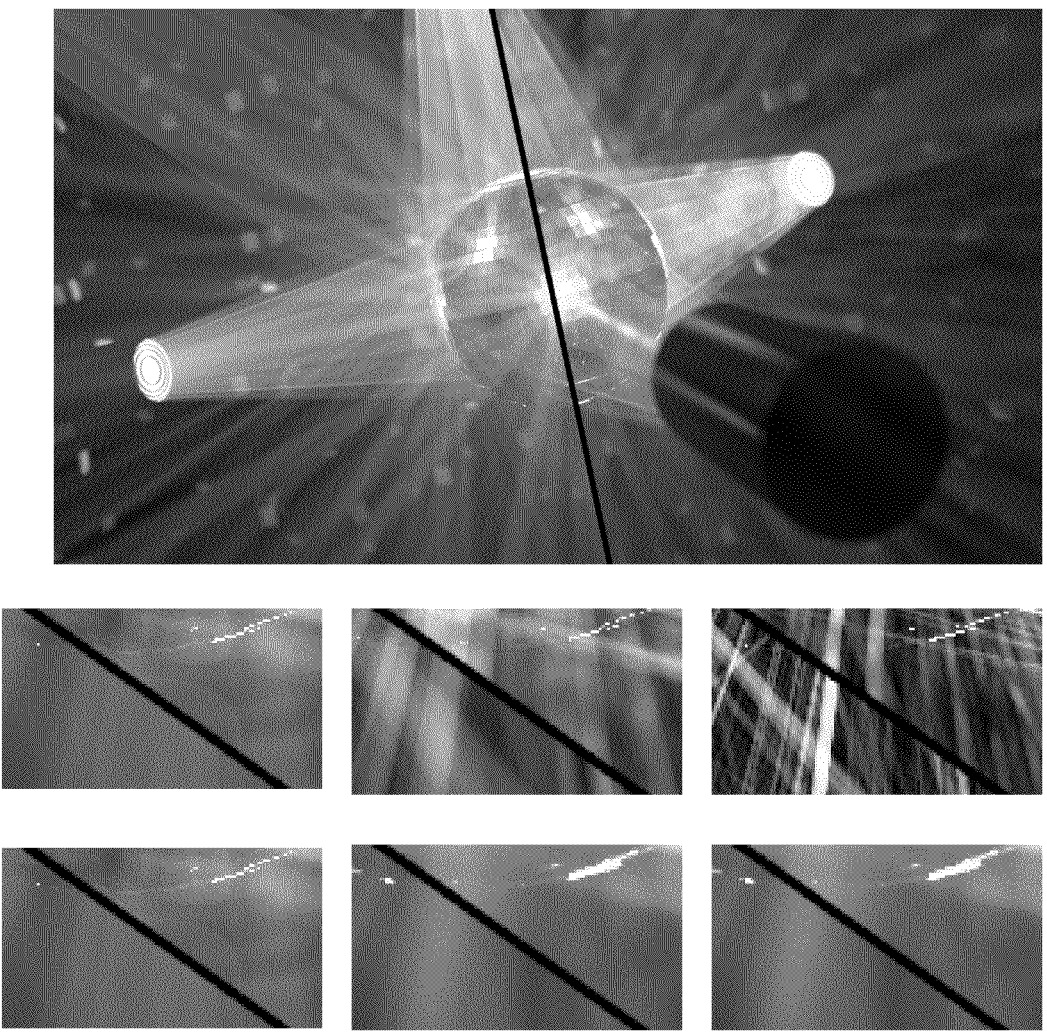
FIG. 1(a) relates to a disco ball scene, the results for independent render passes, and averages of the multiple render passes.
Figure 1B:
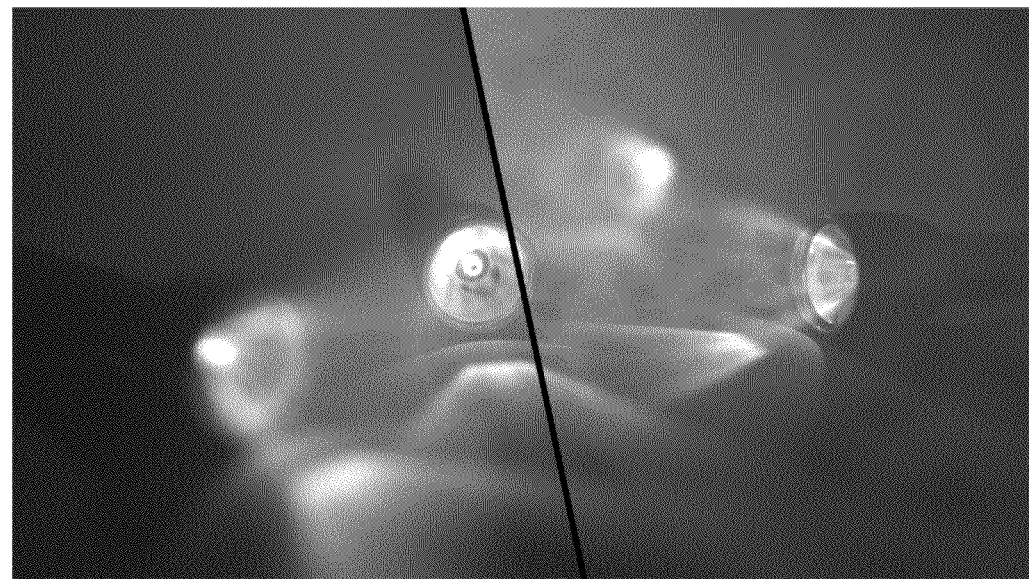
FIG. 1(b) relates to a flashlights scene and corresponding results.
Figure 1B:
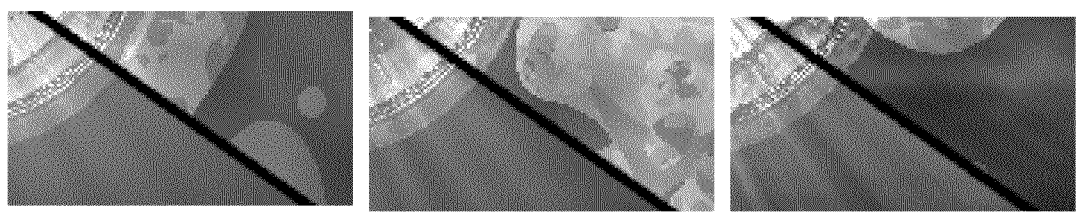
Figure 1B:
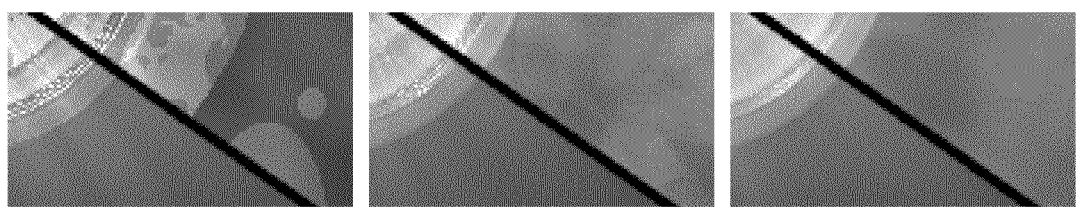

The present invention is described herein, in many places, as a set of computations. It should be understood that these computations are not performable manually, but are performed by an appropriately programmed computer, computing device, electronic device, or the like, that might be a general purpose computer, a graphical processing unit, and/or other hardware. As with any physical system, there are constraints as to the memory available and the number of calculations that can be done in a given amount of time. Embodiments of the present invention might be described in mathematical terms, but one of ordinary skill in the art, such as one familiar with computer graphics, would understand that the mathematical steps are to be implemented for execution in some sort of hardware environment. Therefore, it will be assumed that such hardware and/or associated software or instructions are present and the description below will not be burdened with constant mention of same. Embodiments of the present invention might be implemented entirely in software stored on tangle, non-transitory or transitory media or systems, such that it is electronically readable. While in places, process steps might be described by language such as "we calculate" or "we evaluate" or "we determine", it should be apparent in some contexts herein that such steps are performed by computer hardware and/or defined by computer hardware instructions and not persons.

The essential task of such computer software and/or hardware, in this instance is to generate images from a geometric model or other description of a virtual scene. In such instances, it will be assumed that the model/description includes description of a space, a virtual camera location and virtual camera details, objects and light sources. Also, here we will assume some participating media, i.e., virtual media in the space that light from the virtual light sources passes through and interacts with. Such effects would cause some light from the light source to be deflected from the original path from the light source in some direction, deflected off of some part of the media and toward the camera viewpoint. Of course, there need not be actual light and actual reflection, but it is often desirable that the image be generated with realism, i.e., creating images where the effects appear to behave in a manner similar to how light behaves and interacts with objects in a physical space.

As explained above, simple images are easy to render, but often that is not what is desired. Complex images might include participating media such as fog, clouds, etc. but light from transformative objects might also need to be dealt with. An example is caustics, light paths created by light being bent, for example, by passing through glass shapes.

In many descriptions of image generators, the output image is in the form of a two-dimensional ("2D") or three-dimensional ("3D") array of pixel values and in such cases, the software and/or hardware used to generate those images is referred to as a renderer. There might be image generators that generate other representations of images, so it should be understood that unless otherwise indicated, a renderer outputs images in a suitable form. In some cases, the renderer renders an image or images in part, leaving some other module, component or system to perform additional steps on the image or images to form a completed image or images.

As explained, a renderer takes as its input a geometric model or some representation of the objects, lighting, effects, etc. present in a virtual scene and derives one or more images of that virtual scene from a camera viewpoint. As such, the renderer is expected to have some mechanism for reading in that model or representation in an electronic form, store those inputs in some accessible memory and have computing power to make computations. The renderer will also have memory for storing intermediate variables, program variables, as well as storage for data structures related to lighting, photon beams and the like, as well as storage for intermediate images. Thus, it should be understood that when the renderer is described, for example, as having generated multiple intermediate images and averaging them, it should be understood that the corresponding computational operations are performed, e.g., a processor reads values of pixels of the intermediate images, averages the pixel values and stores a result as another intermediate image, an accumulation image, or the final image, etc. The renderer might also include or have access to a random number generator.

In approaches described below, a progressive photon beam process is used. In such a process, photon beams are used in multiple rendering passes, where the rendering passes use different photon beam radii and the results are combined. It might be such that two or more rendering passes use the same photon beam radius, and while most of the examples described herein assume a different photon beam radius for each pass, the invention is not so limited. These processes are efficient, robust to complex light paths, and handle heterogeneous media and anisotropic scattering while provably converging to the correct solution using a bounded memory footprint.

In many examples herein, a progressive mapping with multiple iterations starts with a pass with a given beam radius, followed by a pass with a smaller radius, and so on, until sufficient convergence is obtained. Each pass can be independent of other passes, so the order can be changed among the intermediate images that are averaged together without affecting the final result. In fact, in some embodiments, the radii might vary over an iteration, but the radii for a given beam varying from iteration to iteration, with a similar final result as the case where all of the beams of one radii are in the same iterative pass. Of course, nothing requires that, from iteration to iteration, the same beams be used. In a typical embodiment, suppose a light source is to be represented by 100 beams. Of all the possible beam directions (and beam origin, perhaps, for non-point sources), 100 beams are randomly selected for one iterative pass, and for the next iterative pass, 100 beams are randomly selected, so they are likely to be different from the beams in the first pass. However, when all the intermediate images are combined, their effects average out and converge to the correct solution.

Progressive photon beam methods can robustly handle situations that are difficult for most other algorithms, such as scenes containing participating media and specular interfaces, with realistic light sources completely enclosed by refractive and reflective materials. Our technique described herein handles heterogeneous media and also trivially supports stochastic effects, such as depth-of-field and glossy materials. As explained herein, progressive photon beams can be implemented efficiently on a GPU as a splatting operation, making it applicable to interactive and real-time applications. These features can provide scalability, provide the same physically-based algorithm for interactive feedback and reference-quality, and unbiased solutions.

Convergence is achieved with less computational effort than, say, path tracing, and is robust to SDS or SMS subpaths, and has a bounded memory footprint. GPU acceleration allows for interactive lighting design in the presence of complex light sources and participating media. This makes it possible to produce interactive previews with the same technique used for a high-quality final render—providing visual consistency, an essential property for interactive lighting design tools.

Photon beam handling is a generalization of volumetric photon mapping, which accelerates participating media rendering by considering the full path of photons (beams), instead of just photon scattering locations. Typically, photon beams are blurred with a finite width, leading to bias. Reducing this width reduces bias, but unfortunately increases noise. Progressive photon mapping ("PPM") provides a way to eliminate bias and noise simultaneously in photon mapping. Unfortunately, naively applying PPM to photon beams is not possible due to the fundamental differences between density estimation using points and beams, so convergence guarantees need to be re-derived for this more complicated case. Moreover, previous PPM derivations only apply to fixed-radius or k-nearest neighbor density estimation, which are commonly used for surface illumination. Photon beams, on the other hand, are formulated using variable kernel density estimation, where each beam has an associated kernel. However, using methods and apparatus described herein, the challenges of rendering beams progressively can be overcome. Described herein is an efficient density estimation framework for participating media that is robust to SDS and SMS subpaths, and which converges to ground truth with bounded memory usage. Additionally, it is described how photons beams can be applied to efficiently handle heterogeneous media.

FIG. 1 illustrates example scenes rendered using iterative photon beam rendering. FIG. 1(a) relates to a disco ball scene, the results for independent render passes, and averages of the multiple render passes; FIG. 1(b) relates to a flashlights scene and corresponding results. The left half of the top image shows results for the case where homogeneous media is assumed and the right half of the top image shows results for the case where heterogeneous media is assumed. The middle sequence of images is intermediate images, each done with different beam radii, while the bottom sequence of images are the averaging of the intermediate images. In this example, the photon beam radii are progressive, in that the first one has wide radii and each successive one has a lower radii. As explained herein, it may be that the order is not important, such as where all of the intermediate images are averaged. However, it is sometimes easier to understand if it is assumed that intermediate images are generated in a progressive order.

In such examples, the renderer renders each pass using a collection of stochastically generated photon beams. As a key step, the radii of the photon beams is reduced using a global scaling factor after each pass. Therefore each subsequent image has less bias, but slightly more noise. As more passes are added, however, the average of these intermediate images converges to the correct solution, generating an unbiased solution with finite memory. As explained herein, a theoretical error analysis of density estimation using photon beams derives the necessary conditions for convergence, and a numerical validation of the theory is provided herein. A progressive generalization of deep shadow maps handles heterogeneous media efficiently. The photon beam radiance estimate formulated as a splatting operation exploits GPU rasterization, allowing simple scenes to be rendered with multiple specular reflections in real-time.

Figure 2:
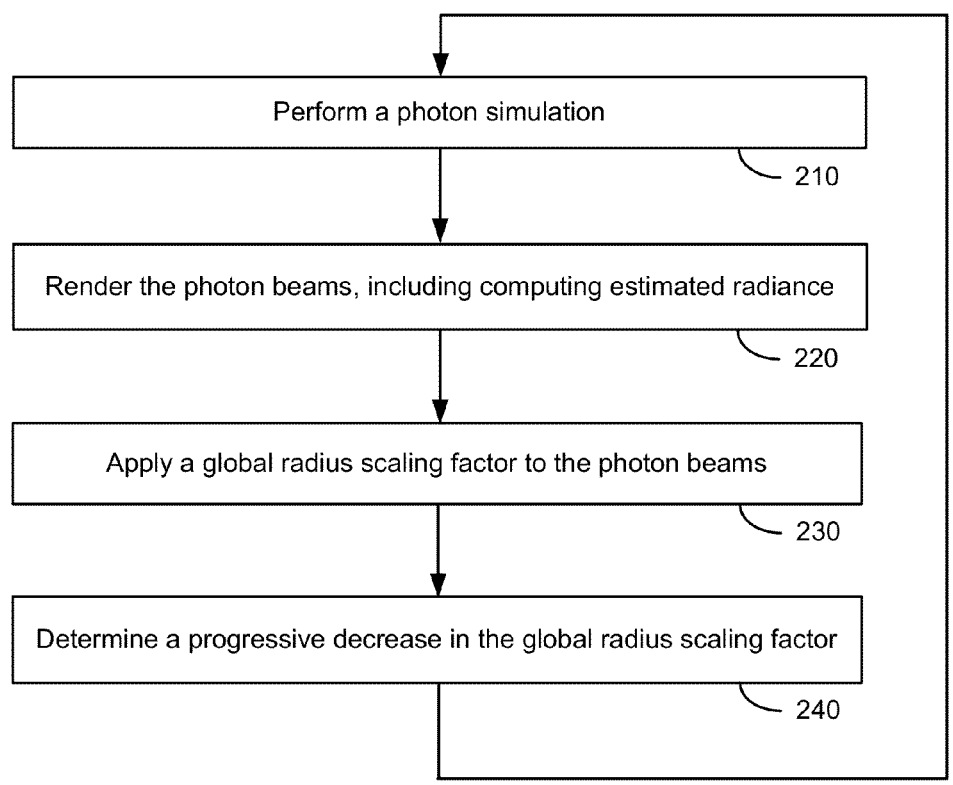
FIG. 2 illustrates a flowchart of a disclosed embodiment.

FIG. 2 illustrates a flowchart of an example embodiment comprising multiple iterations of steps 210 through 240. In step 210, a photon simulation is performed, resulting in a plurality of photon beams in a scene. The photon simulation may be performed in any conventional manner, such as by performing, for example, a shadow-mapping operation, a rasterization operation, a ray-marching operation, or a ray-tracing operation. In some embodiments, the performing photon simulation includes calculating an interaction of the plurality of photon beams with geometry and participating media in the scene.

In step 220, the photon beams are rendered with respect to a camera viewpoint. Rendering the photon beams includes computing estimated radiance associated with the photon beams. Rendering may be performed in any conventional manner, such as by performing, for example, a splatting operation, a ray-tracing operation, a ray-marching operation, or a rasterization operation. In some embodiments, rendering the photon beams comprises determining a contribution of the plurality of photon beams to illumination of one or more pixels in the scene based on a progressive deep shadow map.

In step 230, a global radius scaling factor is applied to the radius used for photon beams, relative to the radius used for the prior iteration. In step 240, the global radius scaling factor is progressively decreased over iterations of steps 210 through 240. In some embodiments, determining a progressive decrease in the global radius scaling factor comprises decreasing a kernel width of the photon beam. In some embodiments, determining a progressive decrease in the global radius scaling factor comprises decreasing a kernel width of a query ray. In some embodiments, determining a progressive decrease in the global radius scaling factor comprises enforcing a ratio of variance between successive iterations.

In some embodiments, a representation of the computed average estimated radiance at each pixel in the scene is stored in a computer-readable storage media, in effect averaging the intermediate images that are rendered in each pass. In some embodiments, the rendered photon beams are discarded after each iteration of steps 210 through 240 in order to reduce memory usage. In some embodiments, rather than reducing the radii each time, the radii are varied in another manner. In some embodiments, rather using the same radius for each beam in an intermediate image, the radii are varied, but are varied so that the same radius is not used repeatedly for the same beam. Beams may be randomly selected among possible beams.

Background Explanation of Light Transport

Technical details of light transport in participating media are explained at the outset below, and relevant equations related to photon beams and progressive photon mapping provided.

Light Transport in Participating Media

In the presence of participating media, the light incident at any point, x, in a scene (e.g., the camera view point) from a direction, $\vec{w}$ (the over arrow here signals a ray or vector), such as direction through a pixel, can be expressed using a radiative transport equation [Chandrasekar 1960] as the sum of two terms, as in Equation 1.

$$L(x,\vec{w}) = T_r(s)L_s(x_s,\vec{w}) + L_m(x,\vec{w}) \quad \text{(Eqn. 1)}$$

The first term is outgoing reflected radiance from a surface, $L_s$, at the endpoint of the ray, $x_s = x - s\vec{w}$, after attenuation due to the transmittance $T_r$. In homogeneous media, $T_r(s) = e^{-\sigma_t s}$, where $\sigma_t$ is the extinction coefficient. In heterogeneous media, transmittance accounts for the extinction coefficient along the entire segment between the two points, but we use this simple one-parameter notation here for brevity. The second term is medium radiance, shown in Equation 2, where f is the normalized phase function, as is the scattering coefficient, and w is a scalar distance along the camera direction $\vec{w}$ (which is itself a vector, as indicated by the superimposed arrow).

$$L_m(x, \vec{w}) = \int_0^s \sigma_s(x_w) T_r(w) \int_{\Omega_{4\pi}} f(\vec{w} \cdot \vec{v}) L(x_w, \vec{v}) d\vec{v} dw \quad \text{(Eqn. 2)}$$

Equation 2 integrates scattered light at all points along $x_w = x - w\vec{w}$ until the nearest surface at distance s. The inner integral corresponds to the in-scattered radiance, which recursively depends on radiance arriving at $x_W$ from directions $\vec{v}$ on the sphere $\Omega_{4\pi}$.

Photon Beams

Photon mapping methods approximate the medium radiance (see, Eqn. 2) using a collection of photons, each with a power, position, and direction. Instead of performing density estimation on just the positions of the photons, the recent photon beams approach [Jarosz et al. 2011] treats each photon as a beam of light starting at the photon position and shooting in the photon's outgoing direction. [Jarosz et al. 2011] derived a "Beam×Beam 1D" estimate that directly estimates medium radiance due to photon beams along a query ray. Herein, a coordinate system $(\vec{u}, \vec{v}, \vec{w})$ is used, where $\vec{w}$ is the query ray direction, $\vec{v}$ is the direction of the photon beam, and $\vec{u} = \vec{v} \times \vec{w}$ is the direction perpendicular to both the query ray and the photon beam.

Figure 3:
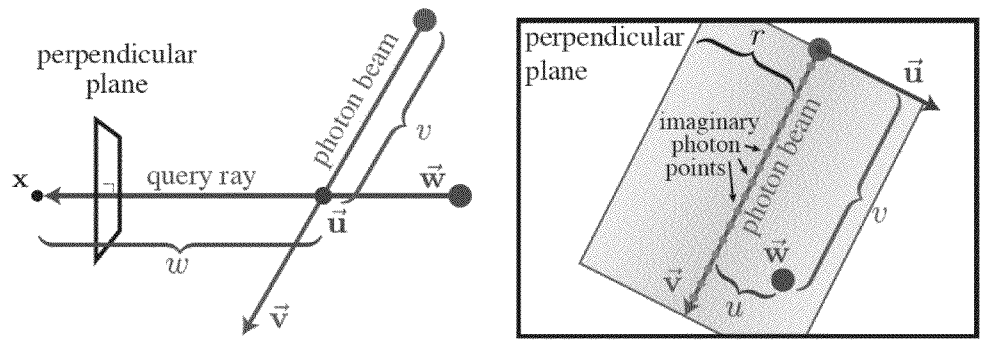
FIG. 3 illustrates the geometric configuration of estimating radiance in some embodiments.

FIG. 3 illustrates a use of this coordinate system and radiance estimation with one photon beam as viewed from the side (left) and in the plane perpendicular to the query ray. The direction $\vec{u} = \vec{v} \times \vec{w}$ extends out of the page (left). To estimate radiance due to a photon beam, treat the beam as an infinite number of imaginary photon points along its length (as shown in the right-hand side of FIG. 3. The power of the photons is blurred in 1D, along $\vec{u}$.

An estimate of the incident radiance along the direction $\vec{w}$ using one photon beam can be expressed as shown in Equation 3, where $\Phi$ is the power of the photon, and the scalars (u, v, w) are signed distances along the three axes to the imaginary photon point closest to the query ray (the point on the beam closest to the ray $\vec{w}$).

$$L_m(x, \vec{w}, r) \approx k_r(u) \sigma_s(x_w) \Phi T_r(w) T_r(v) \frac{f(\vec{w} \cdot \vec{v})}{\sin(\vec{w} \cdot \vec{v})} \quad \text{(Eqn. 3)}$$

The first transmittance term accounts for attenuation through a distance w to x, and the second computes the transmittance through a distance v to the position of the photon. The photon beam is blurred using a 1D kernel $k_r$ centered on the beam with a support width of r along direction $\vec{u}$.

In practice, Equation 3 is evaluated for many beams to obtain a high quality image and is a consistent estimator like standard photon mapping. In other words, it produces an unbiased solution when using an infinite number of beams with an infinitesimally small blur kernel. This is an important property which we will use later on.

However, obtaining an unbiased result requires storing an infinite number of beams, and using an infinitesimal blurring kernel; neither of which are feasible in practice. Below is an analysis of the variance and bias of Equation 3 usable to develop a progressive, memory-bounded consistent estimator.

Progressive Photon Mapping

Progressive photon mapping ("PPM") is known and need not be explained in detail here. [Knaus and Zwicker 2011] builds on a probabilistic analysis of the error in radiance estimation and models the error as consisting of two components: its variance (noise) and its expected value (bias). The main idea in PPM is to average a sequence of images generated using independent photon maps. Radiance estimation can be performed such that both the variance and the expected value of the average error are reduced continuously as more images are added. Therefore, PPM achieves noise- and bias-free results in the limit.

Denote the error of radiance estimation in pass i at some point in the scene being rendered by $\epsilon_i$. Herein, "ϵ" or "$\epsilon$" might refer to an error term. The average error after N passes is $$\bar{\varepsilon}_N = \frac{1}{N} \sum_{i=1}^{N} \varepsilon_i.$$

Since each image i uses a different photon map, the errors $\epsilon_i$ can be interpreted as samples of independent random variables. Hence, the variance (noise) and expected value (bias) of average error are as shown in Equations 4A and 4B, respectively.

$$\text{Var}[\bar{\varepsilon}_N] = \frac{1}{N^2} \sum_{i=1}^{N} \text{Var}[\varepsilon_i] \quad \text{(Eqn. 4A)}$$

$$E[\bar{\varepsilon}_N] = \frac{1}{N} \sum_{i=1}^{N} E[\varepsilon_i] \quad \text{(Eqn. 4B)}$$

Convergence in progressive photon mapping is obtained if the average noise and bias go to zero simultaneously as the number of passes goes to infinity, i.e., as N→∞, as in Equations 5A and 5B that define convergence conditions A and B used herein.

$$\text{Var}[\bar{\varepsilon}_N] \to 0, \text{ as } N \to \infty \quad \text{(Eqn. 5A)}$$

$$E[\bar{\varepsilon}_N] \to 0, \text{ as } N \to \infty \quad \text{(Eqn. 5B)}$$

Observe from Equation 4 that if the same radii were used in the radiance estimate in each pass, the variance of the average error would be reduced, but the bias would remain the same. By decreasing (or varying) the radiance estimation radii in each pass by a small factor. This increases variance in each pass, but only so much that the variance of the average still vanishes. At the same time, reducing the radii decreases the bias, hence achieving the desired convergence.

Applying this to radiance estimation using photon beams provides novel benefits.

Progressive Photon Beams

Figure 4:
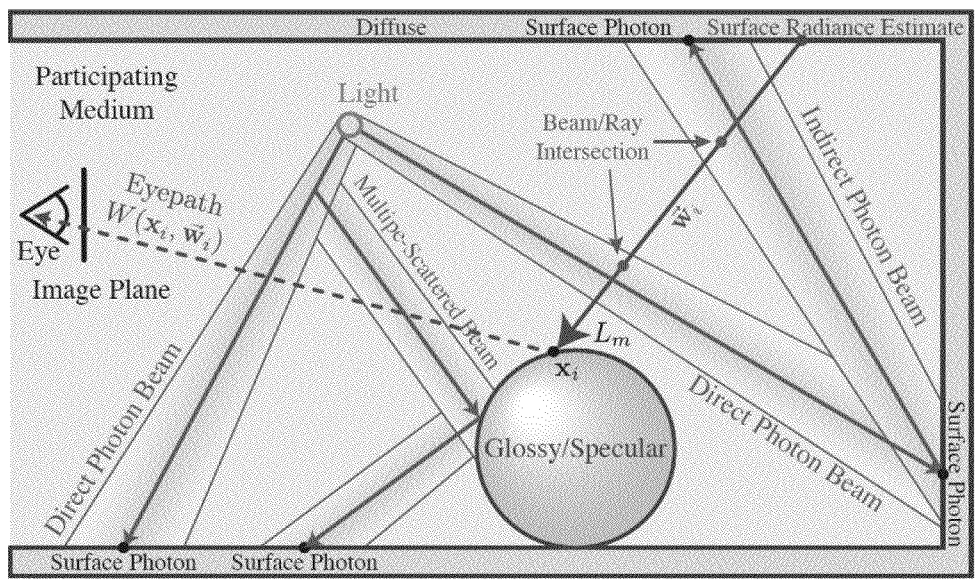
FIG. 4 illustrates estimation of volumetric scattering in some embodiments.

The renderer computes the contribution of media radiance, $L_m$, to pixel values c. FIG. 4 illustrates the problem schematically, and Equation 6 shows this mathematically.

$$c = \iint W(x, \vec{w}) L_m(x, \vec{w}) dx d\vec{w} \quad \text{(Eqn. 6)}$$

As illustrated in FIG. 4, photon beams are shot from light sources and the paths are traced from the eye until a diffuse surface is hit and then the renderer estimating volumetric scattering by finding the beam/ray intersections and weighting by the contribution W to the camera. In each pass, the renderer reduces a global radius scaling factor and repeats.

In Equation 6, W( ) is a function that weights the contribution of $L_m$ to the pixel value (accounting for antialiasing, glossy reflection, depth-of-field, etc.). The renderer computes c by tracing a number of paths N from the eye, evaluating W, and evaluating the media radiance $L_m$. This forms a Monte Carlo estimate $\bar{c}_N$ for c, as in Equation 7, where $p(x_i, \vec{w}_i)$ denotes the probability density of generating a particular position and direction when tracing paths from the eye and $L_m$ is approximated using photon beams.

$$\bar{c}_N \frac{1}{N} \sum_{i=1}^{N} \frac{W(x_i, \vec{w}_i) L_m(x_i, \vec{w}_i)}{p(x_i, \vec{w}_i)} \quad \text{(Eqn. 7)}$$

—The photon beam approximation of the media radiance introduces an error, which we can make explicit by redefining Equation 3 as in Equation 8, where all terms in Equation 3 except for the kernel have been folded into $\gamma$.

$$L_m(x, \vec{w}, r) = k_r(u)\gamma + \varepsilon(x, \vec{w}, r) \quad \text{(Eqn. 8)}$$

The error term, $\epsilon$, is the difference between the true radiance, $L_m(x,\vec{w})$, and the radiance estimated using a photon beam with a kernel of radius r. As explained herein, this converges.

Error Analysis of Photon Beam Density Estimation

We analyze the variance $\mathrm{Var}[\epsilon(x, \vec{w}, r)]$ of the error (noise), and expected value $E[\epsilon(x, \vec{w}, r)]$ of the error (bias) for the case of one beam first. We then generalize the result for the case of many beams. This allows for a derivation of a progressive estimate for photon beams, and allows us to assign different kernel radii to each beam. Some steps are explained mathematically in more detail in a derivation section below.

Since photon beams are generated using stochastic ray tracing, we can interpret the 1D distance u between a photon beam and a query ray $\vec{w}$ as independent and identically distributed samples of a random variable U with probability density $p_U^{\vec{w}}$. The photon contributions $\gamma$ can take on different values, which we again model as samples of a random variable. We assume that u and $\gamma$ are independent. The variable $\gamma$ incorporates several terms: $\sigma_s$, $\Phi$, and the transmittance along w are all independent of u, and the remaining terms depend on v. Graphically, we assume that if we fix our query location and generate a random beam, the distances u and v (see right-hand side of FIG. 3) are mutually independent (note that these measure distance along orthogonal directions). This assumption need only hold locally since only beams close to a query ray contribute. Additionally, as the beam radii decrease, the accuracy of this assumption increases.

Variance using One Photon Beam

To derive the variance of the error, we also assume that locally (within the 1D kernel's support at $\vec{w}$), the distance u between the beam and view ray is a uniformly distributed random variable. This is similar to the uniform local density assumption used in previous PPM methods [Hachisuka et al. 2008; Knaus and Zwicker 2011]. We show in the derivation section below that under these assumptions, the variance can be expressed as shown by Equation 9, wherein $C_1$ is a constant derived from the kernel, and $p_U^{\vec{w}}(0)$ is the probability density of a photon beam intersecting the view ray $\vec{w}$ exactly.

$$\mathrm{Var}[\epsilon(x,\vec{w},r)] = (\mathrm{Var}[\gamma] + E[\gamma]^2) p_U^{\vec{w}}(0) C_1/r \quad \text{(Eqn. 9)}$$

This result states that the variance of beam radiance estimation increases linearly if we reduce the kernel radius r.

Expected Error using One Photon Beam

On the other hand, in the derivation section below, we show that, for some constant $C_2$, the expected error decreases linearly as we reduce the kernel support r, as in Equation 10.

$$E[\epsilon(x,\vec{w},r)] = rE[\gamma]C_2 \quad \text{(Eqn. 10)}$$

Using Many Beams

In practice, the photon beam method generates images using more than one photon beam at a time. Moreover, the photon beam widths need not be equal, but could be determined adaptively per beam using, e.g., photon differentials. We can express this by generalizing Equation 8 into Equation 8A.

$$L_m(x, \vec{w}, r_1 \ldots r_M) = \frac{1}{M}\sum_{j=1}^{M} k_{r_j}(u_j)\gamma_j - \varepsilon(x, \vec{w}, r_1 \ldots r_M) \quad \text{(Eqn. 8A)}$$

In the derivation section below, we show that if we use M beams, each with their own radius $r_j$ at $\vec{w}$, the variance of the error is as shown in Equation 11, where $r_H$ is the harmonic mean of the radii, $$1/r_H = \frac{1}{M}\sum \frac{1}{r_j}.$$

This includes the expected behavior that variance decreases linearly with the number of emitted photon beams M.

$$\mathrm{Var}[\varepsilon(x, \vec{w}, r_1 \ldots r_M)] = \frac{1}{M}\frac{(\mathrm{Var}[\gamma] + E[\gamma]^2)p_U^{\vec{w}}(0)C_1}{r_H} \quad \text{(Eqn. 11)}$$

Furthermore, we show that the expected error is now is illustrated subsection D of the derivation section below, and in Equation 12, where $r_A$ is the arithmetic mean of the photon radii. Note that this does not depend on M, so the expected error (bias) will not decrease as we use more photon beams.

$$E[\epsilon(x,\vec{w},r_1 \ldots r_M)] = r_A E[\gamma]C_2 \quad \text{(Eqn. 12)}$$

To be absolutely precise, this analysis requires that the minimum radius in any pass be non-zero (to avoid infinite variance) and the maximum radius be finite (to avoid infinite bias). In practice, enforcing some bounds is not a problem and the high-level intuition remains the same: the variance increases linearly and expected error decreases linearly if we globally decrease all the beam radii as well as these radii bounds. It is also worth highlighting that for photon beams this relationship is linear due to the 1D blurring kernel. This is in contrast to the analysis performed by Knaus and Zwicker, which resulted in a quadratic relationship for the standard radiance estimate on surfaces and a cubic relationship for the volumetric radiance estimate using photon points.

Our analysis generalizes previous work in two important ways. Firstly, we consider the more complicated case of photon beams, and secondly, we allow the kernel radius to be associated with data elements (e.g., photons or photon beams) instead of the query location (as in k-nearest neighbor estimation). This second feature not only applies to photon beams but also allows variable kernel density estimation in any PPM context, such as density estimation on surfaces or in media using photons. The blur dimensionality (1D, 2D, or 3D) will dictate whether the variance and bias relationship is linear, quadratic or cubic.

Achieving Convergence

To obtain convergence using the approach outlined above, we show how to enforce conditions A and B (from Equations 5A and 5B). With PPM, the variance increases slightly in each pass, but in such a way that the variance of the average error still vanishes. Increasing variance allows us to reduce the kernel scale (see Eqn. 11), which in turn reduces the expected error of the radiance estimate (see Eqn. 12).

The convergence in PPM can be achieved by enforcing the ratio of variance between passes as indicated in Equation 13, where $\alpha$ is a user specified constant between 0 and 1.

$$Var[\epsilon_{i+1}]/Var[\epsilon_i]=(i+1)/(i+\alpha) \qquad \text{(Eqn. 13)}$$

Given the variance of the first pass, this ratio induces a variance sequence, where the variance of the i-th pass is predicted as shown in Equation 14.

$$Var[\epsilon_{i+1}] = Var[\epsilon_1]\left(\prod_{k=1}^{i-1} \frac{k}{k+\alpha}\right)i \qquad \text{(Eqn. 14)}$$

Using this ratio, the variance of the average error after N passes can be expressed in terms of the variance of the first pass, $Var[\epsilon_1]$, as in Equation 15, which vanishes as desired when $N \to \infty$. Hence, if we could enforce such a variance sequence, we would satisfy condition A.

$$Var[\overline{\epsilon}_N] = \frac{Var[\epsilon_1]}{N^2}\left(1 + \sum_{i=2}^{N}\left(\prod_{k=1}^{i-1} \frac{k}{k+\alpha}\right)i\right) \qquad \text{(Eqn. 15)}$$

Radius Reduction Sequence

In one particular approach, the renderer uses a global scaling factor, $R_i$, to scale the radius of each beam, as well as the minimum and maximum radii bounds, in pass i. Note that by scaling all radii by that global scaling factor, that scales their harmonic and arithmetic means by that factor as well. To modify the radii such that the increase in variance between passes corresponds to Equation 13, the renderer can use the expression for variance of Equation 11 in this ratio. Since variance is inversely proportional to beam radius, Equation 16 would hold.

$$R_{i+1}/R_i = Var[\epsilon_i]/Var[\epsilon_{i+1}]=(i+\alpha)/(i+1) \qquad \text{(Eqn. 16)}$$

Given an initial scaling factor of $R_1=1$, this ratio induces a sequence of scaling factors according to Equation 17., $$R_i = \left(\prod_{k=1}^{i-1} \frac{k+\alpha}{k}\right)\frac{1}{i} \qquad \text{(Eqn. 17)}$$

Expected Value of Average Error

Since the expected error is proportional to the average radius (Eqn. 12), we can obtain a relation regarding the expected error of each pass from Equation 17, to get the result of Equation 18, where $\epsilon_i$ is the error of the first pass.

$$E[\epsilon_i]=E[\epsilon_i]R_i \qquad \text{(Eqn. 18)}$$

We can solve for the expected value of the average error in a similar way to Equation 15, with the result of Equation 19, which vanishes as $N \to \infty$. Hence, by using the radius sequence in Equation 17, we furthermore satisfy condition B.

$$E[\overline{\epsilon}_i] = \frac{E[\epsilon_1]}{N}\left(1 + \sum_{i=2}^{N}\left(\prod_{k=1}^{i-1} \frac{k+\alpha}{k}\right)\frac{1}{i}\right) \qquad \text{(Eqn. 19)}$$

Empirical Validation

We validated the approach described above against a reverse path tracing reference solution of the Disco scene of FIG. 1. This is an incredibly difficult scene for unbiased path sampling techniques. We computed many connections between each light path and the camera to improve convergence. Unfortunately, since the light sources in this scene are point lights, mirror reflections of the media constitute SMS subpaths, which cannot be simulated. We therefore visualize only media radiance directly visible by the camera and compare to the media radiance using the techniques taught herein. A reference solution took over three hours to render while our technique requires only three minutes (including SDS and SMS subpaths). We used $\alpha$=0.7 and used 19.67 million beams in total.

Figure 5:
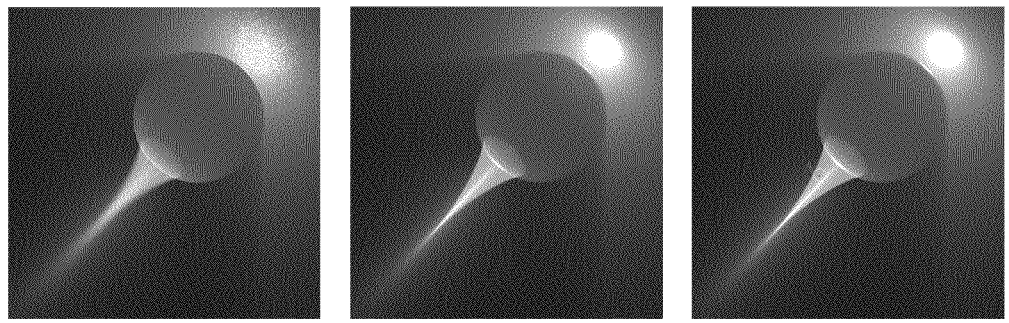
FIG. 5 illustrates three versions of an example scene rendered using an embodiment of the invention.

We also numerically validated our error analysis by examining the noise and bias behavior (for three values of $\alpha$) of the highlighted point in the "Sphere Caustic" image shown as FIG. 5. The "Sphere Caustic" image contains a glass sphere, an anisotropic medium, and a point light. We shot 1K beams per pass and obtained a high-quality result in 100 passes. The rightmost image—for 100 passes—completed in 10 seconds.

Figure 6:
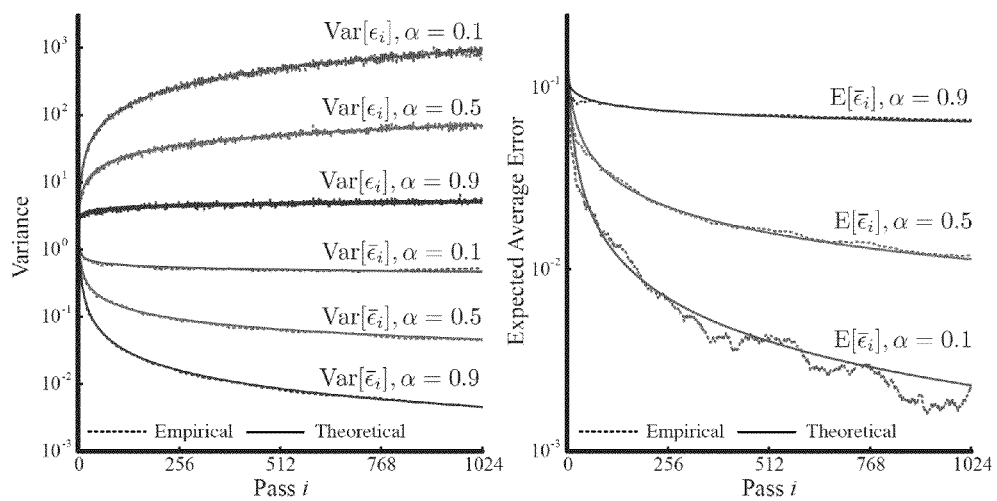
FIG. 6 shows two graphs plotting sample variance of error, sample variance of average error, and expected value of the average error with three different α settings for the highlighted point in the example scene in FIG. 5.

FIG. 6 provides graphs of corresponding bias and variance of the highlighted point. We used progressive photon beams to simulate multiple scattering and multiple specular bounces of light in the glass. We computed 10,000 independent runs of our simulation and compared these empirical statistics to the theoretical behavior predicted by our models. On the left of FIG. 6, the sample variance of the radiance estimate as a function of the iterations is shown, in particular the per-pass variance (left; upper three curves), the average variance (left; lower three curves), and bias (right) with three $\alpha$ settings for the highlighted point in FIG. 5. Empirical results match the theoretical models derived herein well. The noise in the empirical curves is due to a limited number (10K) of measurement runs.

Since the theoretical error model used depends on some scene-dependent constants that are not possible to estimate in the general case, we fitted these constants to the empirical data. We gather statistics for $\alpha$=0.1, 0.5, and 0.9, showing the effect of this parameter on the convergence. The top curves in FIG. 6 (left) show that the variance of each pass increases, as predicted by Equation 14. The lower three curves in FIG. 6 (left) show that variance of the average error decreases after each pass as Equation 15 predicts. We also examined the expected average error (bias) in FIG. 6 (right). These experiments show that both the bias and noise decay with the number of passes.

Example Progressive Photon Beams Process

The example process described in this section has an inner loop and an outer loop. The inner loop can be the standard two-pass photon beam process described in [Jarosz et al. 2011] or some other method.

In the first pass, photon beams are emitted from lights and scatter at surfaces and media in the scene. Other than computing appropriate beam widths, this pass can be effectively identical to the photon tracing in volumetric and surface-based photon mapping described by [Jensen 2001]. The process determines the kernel width of each beam by tracing photon differentials during the photon tracing process. The process also includes automatically computing and enforcing radii bounds to avoid infinite variance or bias. Of course, as explained above, the order might not matter.

In the second pass, the renderer computes radiance along each ray using Equation 3 or equivalent. For homogeneous media, this involves a couple of exponentials and scaling by the scattering coefficient and foreshortened phase function. The case for heterogeneous media is described further below.

In the progressive estimation framework, these two steps are repeated in each progressive pass, scaling the widths of all beams (and the radii bounds) by the global scaling factor. Other approaches are possible instead.

User Parameters

In some embodiments, a user (artist, image maker, etc.) can have a single intuitive parameter to control convergence. In standard PPM, a number of parameters influence the process' performance, such as the bias-noise tradeoff $\alpha \in (0,1)$, the number of photons per pass, M, and either a number of nearest neighbors k or an initial global radius.

Unfortunately, the parameters $\alpha$ and M both influence the bias-noise tradeoff in an interconnected way. Since the radius is updated each pass, increasing M means that the radius is scaled more slowly with respect to the total number of photons after N passes. This is illustrated in differences between curves in FIG. 7.

Figure 7:
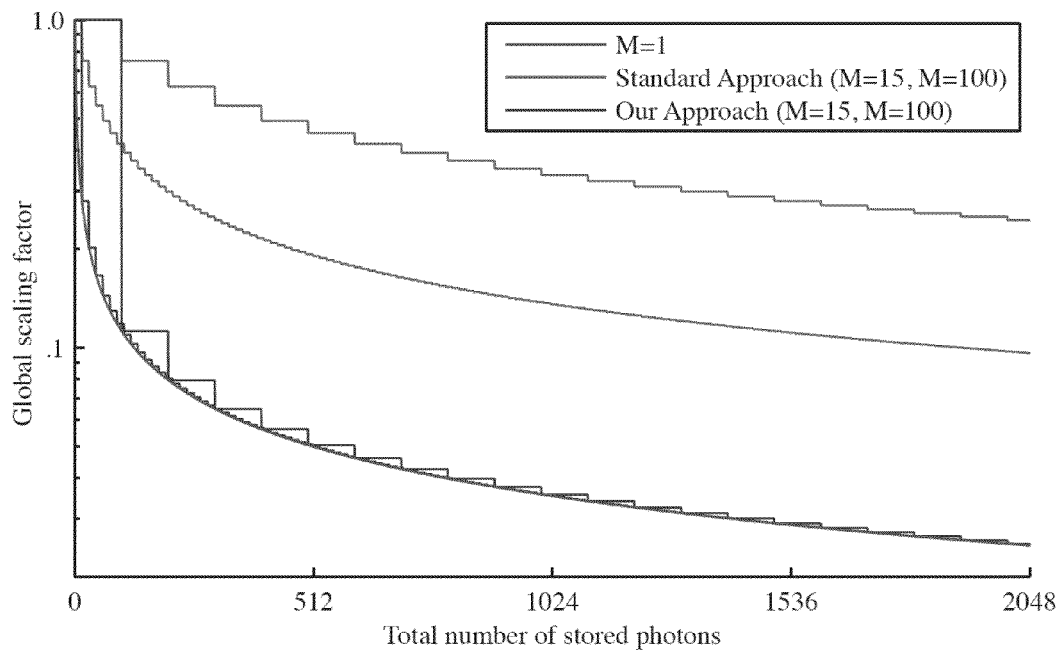
FIG. 7 shows a graph plotting the global radius scaling factor with variations in scale factor, M.

FIG. 7 is a plot of the global radius scaling factor, with varying M. The standard approach produces vastly different scaling sequences for a progressive simulation using the same total number of stored photons. We reduce the scale factor M times after each pass, which approximates the scaling sequence of M=1 regardless of M.

Given two progressive runs, we would hope to obtain the same output image if the same total number of beams has been shot, regardless of the number M per pass. We provide a simple improvement that achieves this intuitive behavior by reducing the effect of M on the bias-noise tradeoff. That solution is to always apply M progressive radius updates after each pass. This induces a piecewise constant approximation of M=1 (the smooth lowest curve in FIG. 7) for the radius reduction, at any arbitrary setting of M (the lower stepwise curves in FIG. 7), as compared to the upper two stepwise curves that correspond to the standard approach for M=15 and M=100. This modifies Equations 16 and 17 to Equations 20 and 21, respectively.

$$\frac{R_{i+1}}{R_i} = \sum_{j=1}^{M} \frac{(i-1)M + j + \alpha}{(i-1)M + j + 1} \quad \text{(Eqn. 20)}$$

$$R_i = \left( \prod_{k=1}^{M_i-1} \frac{k+\alpha}{k} \right) \frac{1}{M_i} \quad \text{(Eqn. 21)}$$

It is clear that variance still vanishes in this modified scheme, since the beams in each pass have larger (or for the first pass equal) radii to the "single beam per pass" (M=1) approach. The expected error vanishes, because eventually the scaling factor is still zero.

Evaluating $\gamma$ in Heterogeneous Media

In theory, our error analysis and convergence derivation above applies to both homogeneous and heterogeneous media—the properties of the medium are encapsulated in the random variable $\gamma$. To realize a convergent process for heterogeneous media, however, the scattering properties should be evaluated and the transmittances contained in $\gamma$ computed. Unfortunately, the standard approach in graphics for computing transmittance, ray marching, is biased, and would compromise the process. To ensure convergence, the renderer's transmittance estimator should be unbiased.

An unbiased estimator can be implemented, in one example, by using mean-free path sampling as a black-box. Given a function, $d(x,\vec{w})$, which returns a random propagation distance from a point x in direction $\vec{w}$, the transmittance between x and a point s units away in direction $\vec{w}$ is as shown by Equation 22, where $\delta$ is the Heaviside step function. This estimates transmittance by counting samples that successfully propagate a distance $\geq s$.

$$T_r(x, \vec{w}, s) = E\left[ \frac{1}{n} \sum_{j=0}^{n} \delta(d(x, \vec{w}) - s) \right] \quad \text{(Eqn. 22)}$$

A naive solution would be to use this algorithm to compute the two transmittance terms when evaluating Equation 8. This approach can be applied to both homogeneous media, where $d(x, \vec{w}) = -\log(1-\xi)\sigma_t$, and to heterogeneous media, where $d(x, \vec{w})$ can be implemented using Woodcock tracking [Woodcock et al. 1965]. Woodcock tracking is an unbiased technique for sampling mean-free paths within heterogeneous media used in the particle physics field and recently introduced to graphics by [Raab et al. 2008].

Though this approach converges to the correct result, it is inefficient, since obtaining low variance requires many samples, and there are many ray/beam intersections to evaluate. An improved process will efficiently evaluate transmittance for all ray/beam intersections. We first consider transmittance towards the eye, and then transmittance along each photon beam.

Progressive Deep Shadow Maps

Figure 8:
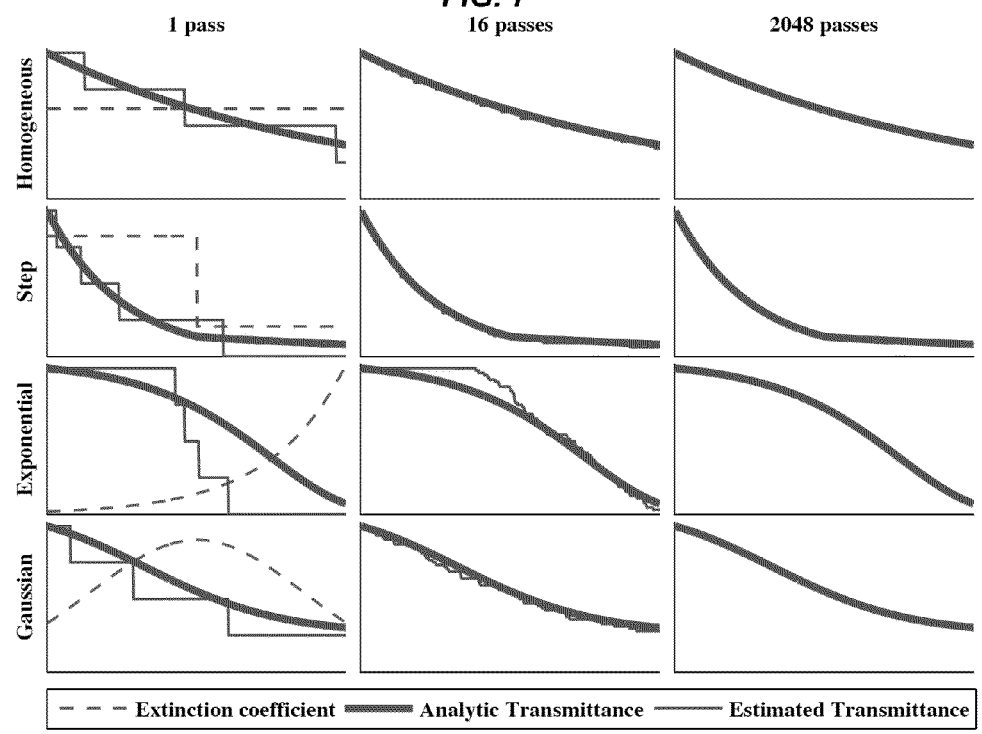
FIG. 8 illustrates media radiance in an example scene rendered using an embodiment of the invention.

The naive approach evaluates Equation 22 for each ray/beam intersection within a pixel. Each evaluation, however, actually provides enough information for an unbiased estimate of the transmittance function for all distances along the ray, and not just the function value at a single distance s. A renderer can handle this by computing n propagation distances and re-evaluating Equation 22 for arbitrary values of s. This results in an unbiased, piecewise-constant representation of the transmittance function, as illustrated in the left-hand side of FIG. 8. There, validation of progressive deep shadow maps is shown (thin solid line) for extinction functions (dashed line) with analytically-computable transmittances (thick solid line). In one embodiment, four random propagation distances are used, resulting in a four-step approximation of transmittance in each pass.

The collection of transmittance functions across all primary rays could be viewed as a deep shadow map from the camera. Deep shadow maps also store multiple distances to approximate transmittance; however, the key difference here is that our transmittance estimator remains unbiased, and will converge to the correct solution when averaged across passes. In subsection E of the derivation section below, we prove this convergence and validate it empirically for heterogeneous media with closed-form solutions to transmittance in FIG. 8.

In our approach, we similarly accelerate transmittance along each beam. Instead of repeatedly evaluating Equation 22 at each ray/beam intersection, the renderer can and store several unbiased random propagation distances along each beam. Given these distances, it can re-evaluate transmittance using Equation 20 at any distance along the beam. The collection of transmittance functions across all photon beams forms an unstructured deep shadow map that converges to the correct result with many passes.

Effect on Error Convergence

When using Equation 22 to estimate transmittance, the only effect on the error analysis is that Var[γ] in Equations 9 and 11 increases compared to using analytic transmittance (note that bias is not affected since E[γ] does not change with an unbiased estimator). Homogeneous media could be rendered using the analytic formula or using Equation 22. Both approaches converge to the same result (as illustrated by the top row of FIG. 8), but the Monte Carlo estimator for transmittance adds additional variance. In some cases then, it is preferred to use analytic transmittance in the case of homogeneous media.

Specific Constructions

In this section, we discuss several efficient implementations of our theory, demonstrating its flexibility and generality. First, we introduce our most general implementation, which is a CPU-GPU hybrid capable of rendering arbitrary surface and volumetric shading effects, including complex paths with multiple reflective, refractive and volumetric interactions in homogeneous or heterogeneous media. We also present two GPU-only implementations: a GPU ray-tracer capable of supporting general lighting effects, and a rasterization-only implementation that uses a custom extension of shadow-mapping to accelerate beam tracing. Both the hybrid and rasterization demos exploit a reformulation of the beam radiance estimate as a splatting operation, described in the next section.

Hybrid Beam Splatting and Ray-Tracing Renderer

A more general renderer combines a CPU ray tracer with a GPU rasterizer and possibly a GPU that can handle GPU operations. The CPU ray tracer handles the photon shooting process. For radiance estimation, the renderer can decompose the light paths into ones that can be easily handled using GPU-accelerated rasterization, and handle all other light paths with the CPU ray tracer. The renderer can rasterize all photon beams that are directly visible by the camera. The CPU ray tracer then handles the remaining light paths, such as those visible only via reflections/refractions off of objects.

Note that Equation 3 has a simple geometric interpretation, as illustrated in FIG. 3, namely that each beam is an axial-billboard facing the camera. As in the standard photon beams approach, the CPU ray tracer computes ray-billboard intersections with this representation. However, for directly-visible beams, Equation 3 can be reformulated as a splatting operation amenable to GPU rasterization and thus GPU instructions can be generated.

In one implementation of the hybrid approach C++ is used and so is OpenGL. In that implementation, after CPU beam shooting, the photon beam billboard quad geometry is generated for every stored beam on the CPU. This geometry is rasterized with GPU blending enabled and a simple pixel shader evaluates Equation 3 for every pixel under the support of the beam kernel on the GPU. The renderer also culls the beam quads against the remaining scene geometry to avoid computing radiance from occluded beams. To handle stochastic effects such as anti-aliasing and depth-of-field, the renderer can apply a Gaussian jitter to the camera matrix in each pass. The CPU component handles all other light paths using Monte Carlo ray tracing with a single path per pixel per pass.

For homogeneous media, the fragment shader evaluates Equation 3 using two exponentials for the transmittance. It can use several layers of simplex noise for heterogeneous media, and follow the approach derived above for progressive deep shadow maps. For transmittance along a beam, it computes and stores a fixed number, $n_b$, of random propagation distances along each beam using Woodcock tracking (in practice, $n_b$ is usually between 4 and 16). Since transmittance is constant between these distances, we can split each beam into $n_b$ quads before rasterizing and assign the appropriate transmittance to each segment using Equation 22.

For transmittance towards the camera, we construct a progressive deep shadow map on the GPU using Woodcock tracking. This is updated before each pass, and accessed by the beam fragment shader to evaluate transmittance to the camera. We implement this by rendering to an off-screen render target and pack four propagation distances per pixel into a single RGBA output. We can use the same random sequence to compute Woodcock tracking for each pixel within a single pass. This replaces high-frequency noise with coherent banding while remaining unbiased across many passes. This also improves performance slightly due to more coherent branching behavior in the fragment shader. Some renderers can support up to $n_c$=12 distances per pixel in some implementations (using three render targets). However, it may be that using a single RGBA texture is a good performance-quality compromise.

Raytracing on the GPU

In another implementation, the OptiX GPU ray tracing API described by [Parker et al. 2010] is used. That OptiX renderer implements two kernels: one for photon beam shooting, and one for eye ray tracing and progressive accumulation. The renderer shoots and stores photon beams, in parallel, on the GPU. The shading kernel traces against all scene geometry and photon beams, each stored in their own BVH, with volumetric shading computed using Equation 3 at each beam intersection.

Augmented Shadow Mapping for Beam Shooting

In another implementation, a real-time GPU renderer only uses OpenGL rasterization in scenes with a limited number of specular bounces. Shadow mapping is extended to trace and generate beam quads that are visualized with GPU rasterization as above. [McGuire et al. 2009] also used shadow maps, but that was limited to photon splatting on surfaces. In this renderer, it generates and splats beams, possibly exploiting a progressive framework to obtain convergent results.

A light-space projection transform (as in standard shadow mapping) can be used to rasterize the scene from the light's viewpoint. Instead of recording depth for each shadow map texel, each texel instead produces a photon beam. At the hit-point, the renderer computes the origin and direction of the central beam as well as the auxiliary differential rays. The differential ray intersection points are computed using differential properties stored at the scene geometry as vertex attributes, interpolated during rasterization. Depending on whether the light is inside or outside a participating medium, beam directions are reflected and/or refracted at the scene geometry's interface. This entire process can be implemented in a simple pixel shader that outputs to multiple render-targets. Depending on the number of available render targets, several (reflected, refracted, or light) beams can be generated per render pass.

The render target outputs can be snapped to vertex buffers and render points at the beam origins. The remainder of the beam data is passed as vertex attributes to the point geometry, and a geometry shader converts each point into an axial billboard. These quads can then be rendered using the same homogeneous shader as the hybrid example described above. To ensure convergence, the shadow map grid can be jittered to produce a different set of beams each pass. This end-to-end rendering procedure can be carried out entirely with GPU rasterization, and can render photon beams that emanate from the light source as well as those due to a single surface reflection/refraction.

Results

A hybrid implementation might use a 12-core 2.66 GHz Intel Xeon™ 12 GB with an ATI Radeon HD 5770. The examples of FIG. 1 were generated in that manner, in both homogeneous and heterogeneous media, including zoomed insets of the media illumination showing the progressive refinement of the process. The scenes are rendered at 1280× 720, and they include depth-of-field and antialiasing. The lights in these scenes are all modeled realistically with light sources inside reflective/refractive fixtures. Illumination encounters several specular bounces before arriving at surfaces or media, making these scenes impractical for path tracing. PPM can be used for surface shading, while PPB is used to get performance and quality on the media scattering.

The Disco scene of FIG. 1 contains a mirror disco ball illuminated by six lights inside realistic Fresnel-lens casings. Each Fresnel light has a complex emission distribution due to refraction, and the reflections off of the faceted sphere produce intricate volume caustics. In an implementation being tested, the media radiance was rendered in three minutes in homogeneous media and 5.7 minutes in heterogeneous media. The surface caustics on the wall of the scene require another 7.5 minutes. The Flashlights scene renders in 8.0 minutes and 10.8 minutes respectively using 2.1M beams (diffuse shading takes an additional 124 minutes). These results show that heterogeneous media incurs only a marginal performance penalty over homogeneous media using photon beams.

Beam storage includes start and end points (2×3 floats), differential rays (2×2×3 floats), and power (3 floats). A scene-dependent acceleration structure might also be necessary, and even for a single bounding box per beam, this is 2×3 floats (it can use a BVH and implicitly split beams as described in [Jarosz, et al. 2011]). The implementation need not be optimized for memory usage with the progressive approach, but even with careful tuning this would likely be above 100 bytes per beam. Thus, even in simple scenes, beam storage can quickly exceed available memory. A scene with intricate refractions might require over 50M beams for high-quality results and that would exceed 5 GB of memory even with the conservative 100 bytes/beam estimate. Using the progressive approach, this is not a problem.

Our beams use adaptive kernels with ray differentials, which may allow for higher quality results using fewer beams. Also, rasterization is used for large portions of the illumination, which improves performance.

Shadow Mapping Implementation Results

Figure 9:
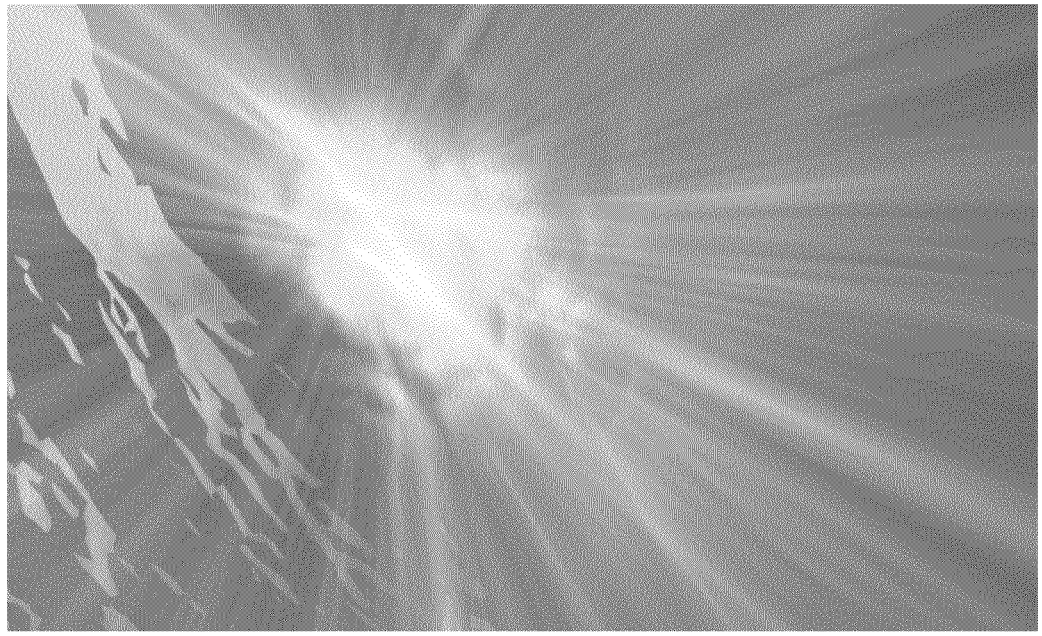
FIG. 9 illustrates two versions of an example scene, in this case rendered entirely on a GPU, using an embodiment of the invention.
Figure 9:
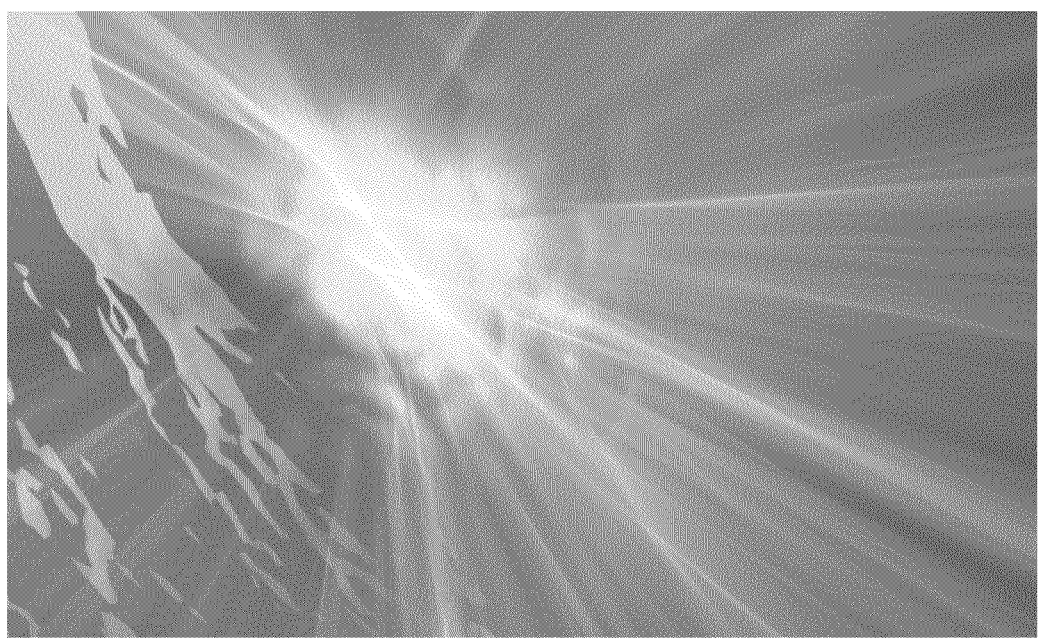

In one test implementation, for interactive and accurate lighting design, we used a 64 by 64 shadow map, generating 4K beams, and rendered progressive passes in less than two milliseconds per frame for the ocean geometry of FIG. 9 with 13M triangles. By jittering the perspective projection, antialiasing and depth-of-field effects can be incorporated. Since every progressive pass reduces the beam width, higher passes render significantly faster. FIG. 9 illustrates the OCEAN scene, where the viewer sees light beams refracted through the ocean surface and scattering in the ocean's media. In the test implementation, the progressive rasterization converges in less than a second. It can be done in real-time using GPU rasterization with 4K beams at around 600 FPS, which is less than 2 ms). The image after 20 passes (top) renders at around 30 FPS (33 ms). The high-quality result renders in less than a second (bottom, 450 passes).

Hardware Example

FIG. 10 is a block diagram of hardware that might be used to implement a renderer.

The renderer can use a dedicated computer system that only renders, but might also be part of a computer system that performs other actions, such as executing a real-time game or other experience with rendering images being one part of the operation.

Rendering system 800 is illustrated including a processing unit 820 coupled to one or more display devices 810, which might be used to display the intermediate images or accumulated images or final images, as well as allow for interactive specification of scene elements and/or rendering parameters. A variety of user input devices, 830 and 840, may be provided as inputs. In one embodiment, a data interface 850 may also be provided.

In various embodiments, user input device 830 includes wired-connections such as a computer-type keyboard, a computer mouse, a trackball, a track pad, a joystick, drawing tablet, microphone, and the like; and user input device 840 includes wireless connections such as wireless remote controls, wireless keyboards, wireless mice, and the like. In the various embodiments, user input devices 830-840 typically allow a user to select objects, icons, text and the like that graphically appear on a display device (e.g., 810) via a command such as a click of a button or the like. Other embodiments of user input devices include front-panel buttons on processing unit 820.

Embodiments of data interfaces 850 typically include an Ethernet card, a modem (telephone, satellite, cable, ISDN), (asynchronous) digital subscriber line (DSL) unit, FireWire interface, USB interface, and the like. In various embodiments, data interfaces 850 may be coupled to a computer network, to a FireWire bus, a satellite cable connection, an optical cable, a wired-cable connection, or the like.

Processing unit 820 might include one or more CPU and one or more GPU. In various embodiments, processing unit 820 may include familiar computer-type components such as a processor 860, and memory storage devices, such as a random access memory (RAM) 870, disk drives 880, and system bus 890 interconnecting the above components. The CPU(s) and or GPU(s) can execute instructions representative of process steps described herein.

RAM 870 and hard-disk drive 880 are examples of tangible media configured to store data such as images, scene data, instructions and the like. Other types of tangible media includes removable hard disks, optical storage media such as CD-ROMS, DVD-ROMS, and bar codes, semiconductor memories such as flash memories, read-only-memories (ROMS), battery-backed volatile memories, networked storage devices, and the like (825).

FIG. 10 is representative of a processing unit 820 capable of rendering or otherwise generating images. It will be readily apparent to one of ordinary skill in the art that many other hardware and software configurations are suitable for use with the present invention. For example, processing unit 820 may be a personal computer, handheld computer, server farm, or similar hardware. In still other embodiments, the techniques described below may be implemented upon a chip or an auxiliary processing board.

Derivations

While possibly not necessary for a full understanding of the inventions described above, a number of calculations and equations are provided in this section. Some of these are performed by the apparatus doing the rendering, while others are performed only here to show some analysis or result that is expected to occur by operation of the renderer.

Derivation A—Variance of Beam Radiance Estimation

The variance of the error in Equation 8 is as shown by Equation A1.

$$\mathrm{Var}[\varepsilon(x, \vec{w}, r)] = \mathrm{Var}[k_r(U)\gamma - L(\vec{w})] \qquad \text{(Eqn. A1)}$$
$$= \mathrm{Var}[k_r(U)\gamma](\mathrm{Var}[\gamma] + E[\gamma]^2) +$$
$$\mathrm{Var}[\gamma]E[k_r(U)]^2$$

Using the definition of variance, we have the result of Equation A2, where $\Omega$ is the kernel's support.

$$\mathrm{Var}[k_r(U)] = \int_\Omega k_r(\xi)^2 p_U^{\vec{w}}(\xi)\, d\xi - \left[\int_\Omega k_r(\xi) p_U^{\vec{w}}(\xi)\, d\xi\right]^2 \qquad \text{(Eqn. A2)}$$

We assume that locally (within $\Omega$), the distance between the beam and ray is a uniformly distributed random variable. Hence, the probability density function within the kernel support is constant and equal to the probability density of an imaginary photon landing a distance 0 from our view ray $\vec{w}$: $p_U^{\vec{w}}(\xi) = p_U^{\vec{w}}(0)$ and we get the result of Equation A3.

$$\mathrm{Var}[k_r(U)] = p_U^{\vec{w}}(0)\int_\Omega k_r(\xi)^2\, d\xi - \left[p_U^{\vec{w}}(0)\int_\Omega k_r(\xi)\, d\xi\right]^2 \qquad \text{(Eqn. A3)}$$
$$= p_U^{\vec{w}}(0)\int_\Omega k_r(\xi)^2\, d\xi - p_U^{\vec{w}}(0)^2$$
$$= p_U^{\vec{w}}(0)\left[\int_\Omega k_r(\xi)^2\, d\xi - p_U^{\vec{w}}(0)\right]$$
$$= p_U^{\vec{w}}(0)\left[\frac{1}{r}\int_\Re k\left(\frac{\xi}{r}\right)^2 d\xi - p_U^{\vec{w}}(0)\right]$$

The last step replaces $k_r$ with an equivalently-shaped unit kernel, $k$. Inserting into Equation A1, and noting that $E[k_r(U)] = p_U^{\vec{w}}(0)$ under the uniform density assumption, we have the result of Equation A4, where the second line assumes the kernel overlaps only a small portion of the scene and hence $p_U^{\vec{w}}(0)^2$ is negligible. The term remaining in square brackets is just a constant associated with the kernel, which we denote $C_1$.

$$\mathrm{Var}[\varepsilon(x, \vec{w}, r)] = p_U^{\vec{w}}(0)\left[\frac{1}{r}\int_\Re k\left(\frac{\xi}{r}\right)^2 d\xi - p_U^{\vec{w}}(0)\right] \qquad \text{(Eqn. A4)}$$
$$(\mathrm{Var}[\gamma]E[\gamma]^2) + \mathrm{Var}[\gamma]p_U^{\vec{w}}(0)^2$$
$$\approx \frac{(\mathrm{Var}[\gamma]E[\gamma]^2)p_U^{\vec{w}}(0)}{r}\left[\int_\Re k\left(\frac{\xi}{r}\right)^2 d\xi\right]$$
$$= \frac{(\mathrm{Var}[\gamma]E[\gamma]^2)p_U^{\vec{w}}(0)}{r}C_1$$

Derivation B—Bias of Beam Radiance Estimation

The expected error of our single-photon beam radiance estimate is as shown by Equation B1.

$$E[\varepsilon(x, \vec{w}, r)] = E[k_r(U)\gamma - L(\vec{w})] \qquad \text{(Eqn. B1)}$$
$$= E[\gamma]E[k_r(U)] - L(\vec{w})$$

In the variance analysis in subsection A above, we assumed locally uniform densities. This is too restrictive here since it leads to zero expected error (bias). To analyze the expected error, instead use a Taylor expansion of the density around $\xi p_U^{\vec{w}}(\xi) = p_U^{\vec{w}}(0) + (\xi)\nabla p_U^{\vec{w}}(0) + O(\xi^2)$, and insert into the integral for the expected value of the kernel the quantity shown in Equation B2, where we have used the same change of variable to a canonical kernel $k$.

$$E[k_r(U)] = \frac{1}{r}\int_\Re k\left(\frac{\xi}{r}\right) p_U^{\vec{w}}(\xi)\, d\xi \qquad \text{(Eqn. B2)}$$
$$= \frac{1}{r}\int_\Re k\left(\frac{\xi}{r}\right)\left(p_U^{\vec{w}}(0) + (\xi)\nabla p_U^{\vec{w}}(0) + O(\xi^2)\right) d\xi$$

If we assume a kernel with a vanishing first moment, then the middle term drops out, resulting in Equation B3, for some constant $C_2$.

$$E[k_r(U)] = p_U^{\vec{w}}(0) + \frac{1}{r}\int_\Re k\left(\frac{\xi}{r}\right)\mathcal{O}(\xi^2)\, d\xi \qquad \text{(Eqn. B3)}$$
$$= p_U^{\vec{w}}(0) + \frac{1}{r}\int_\Re k(\psi) r \mathcal{O}(\psi^2) r\, d\psi$$
$$= p_U^{\vec{w}}(0) + r\underbrace{\int_\Re k(\psi)\mathcal{O}(\psi^2)\, d\psi}_{C_2}$$
$$= p_U^{\vec{w}}(0) + rC_2,$$

Combining with Equation B1, and noting an infinitesimal kernel results in the exact radiance as in Equation B4, we obtain the result of Equation B5.

$$L(\vec{w}) = E[\gamma]E[\delta(U)] = E[\gamma]p_U^{\vec{w}}(0) \qquad \text{(Eqn. B4)}$$

$$E[\varepsilon(x, \vec{w}, r)] = E[\gamma](p_U^{\vec{w}}(0) + rC_2) - E[\gamma]p_U^{\vec{w}}(0) = rE[\gamma]C_2 \qquad \text{(Eqn. B5)}$$

Derivation C—Variance Using Many Photons

For M photons in the photon beams estimate, each with their own kernel radius, $r_j$, the variance is as shown in Equation C1, where we use the harmonic mean of the radii in the last step, i.e., $$1/r_H = \frac{1}{M}\sum \frac{1}{r_j}.$$

$$\text{Var}[\epsilon(x, \vec{w}, r_1 \ldots r_M)] = \text{Var}\left[\frac{1}{M}\sum_{j=1}^{M} \epsilon(x, \vec{w}, r_j)\right] \quad \text{(Eqn. C1)}$$

$$= \frac{1}{M^2}\sum_{j=1}^{M} \text{Var}[\epsilon(x, \vec{w}, r_j)]$$

$$= \frac{1}{M^2}\sum_{j=1}^{M} \left[\frac{(\text{Var}[\gamma] + E[\gamma]^2)p_U^{\vec{w}}(0)C_1}{r_j}\right]$$

$$= \frac{(\text{Var}[\gamma] + E[\gamma]^2)p_U^{\vec{w}}(0)C_1}{r_H M},$$

Derivation D—Expected Error Using Many Photons

We apply a similar procedure for expected error using many photon beams. We have Equation D1, where $r_A$ denotes the arithmetic mean of the beam radii.

$$E[\epsilon(x, \vec{w}, r_1 \ldots r_M)] = E\left[\frac{1}{M}\sum_{j=1}^{M} \epsilon(x, \vec{w}, r_j)\right] \quad \text{(Eqn. D1)}$$

$$= \frac{1}{M}\sum_{j=1}^{M} E[\epsilon(x, \vec{w}, r_j)]$$

$$= \frac{E[\gamma]C_2}{M}\sum_{p=1}^{M} r_j$$

$$= r_A E[\gamma]C_2$$

Derivation E—Unbiased Progressive Deep Shadow Maps

Progressive deep shadow maps simply count the number of stored propagation distances, $d_j$, that travel further than s in each pass using Equation 22. If $p(d_j)$ denotes the probability density function ("PDF") of the propagation distance $d_j$, we have the result of Equation E1, where $$\tau(d) = \int_0^d \sigma_t(x + t\vec{w})dt$$

denotes the optical depth.

$$E\left[\frac{1}{n}\sum_{j=0}^{M} \delta(d_j - s)\right] = \int_s^{\infty} p(d)\,dd \quad \text{(Eqn. E1)}$$

$$= \int_s^{\infty} \sigma_t(d)e^{-\tau(d)}\,dd$$

$$= e^{-\tau(s)}$$

The final result, $e^{-\tau(s)}$, is simply the definition of transmittance, confirming that averaging progressive deep shadow maps produces an unbiased estimator for transmittance.

Additional Variations

Even with progressive deep shadow maps, a heterogeneous media rendering is slower than for the homogeneous form. That performance loss of each pass is primarily due to multiple evaluations of Perlin noise, which is quite expensive both on the GPU and CPU. Accelerated variants of Woodcock tracking might be used to reduce the number of density evaluations needed for free-path sampling.

In addition to increased cost per pass, the Monte Carlo transmittance estimator increases variance per pass. The variance of the transmittance estimate increases with distance (where fewer random samples propagate). More precisely, at a distance where transmittance is 1%, only 1% of the beams contribute, which results in higher variance. The worst-case scenario is if both the camera and light source are very far away from the subject (or, conversely, if the medium is optically thick) since most of the beams terminate before reaching the subject, and most of the deep shadow map distances to the camera result in zero contribution. An unbiased transmittance estimator which falls off to zero in a piecewise-continuous, and not piecewise-constant, fashion might be used if this is an issue. Markov Chain Monte Carlo or adaptive sampling techniques could be used to reduce variance.

In some implementations, adaptive techniques might be used to choose a to optimize convergence.

Conclusion

As explained herein, progressive photon beam processing can render complex illumination in participating media. It converges to the gold standard of rendering, i.e., unbiased, noise free solutions of the radiative transfer and the rendering equation, while being robust to complex light paths including SDS and SMS subpaths. Such processing can be combined with photon beams in a simple and elegant way. In each iteration of a progressive process, a global scaling factor is applied to the beam radii and reduced each pass.

Embodiments disclosed herein describe progressive photon beams, a new algorithm to render complex illumination in participating media. The main advantage of the algorithm disclosed herein is that it converges to the gold standard of rendering, i.e., unbiased, noise-free solutions of the radiative transfer and the rendering equation, while being robust to complex light paths including specular-diffuse-specular subpaths.

In some embodiments, the a parameter that controls the trade-off between reducing variance and bias is set to a constant. Some embodiments may adaptively determine this parameter to optimize convergence.

While heterogeneous media can be incorporated into this approach in a straightforward way using ray marching along the beams, extensions of this brute-force approach that may be more computationally efficient. Some embodiments assume that photon beams are sampled using independent, identically distributed random variables. Some embodiments may include adaptive algorithms such as Markov Chain Monte Carlo and adaptive importance sampling.

Further embodiments can be envisioned to one of ordinary skill in the art after reading the attached documents. For example, photon beams can be sampled in various manners. In other embodiments, combinations or sub-combinations of the above disclosed embodiments can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of rendering a resulting image of a scene from a plurality of intermediate images, wherein the scene comprises a volumetric medium, wherein the volumetric medium and lighting of such volumetric medium and scene is represented by electronically readable representative data, the method comprising:

(a) for an initial iteration, performing a photon beam simulation resulting in a representation of a plurality of photon beams in the scene, wherein performance of the photon beam simulation includes selecting a radius for each of the plurality of photon beams;

(b) rendering the plurality of photon beams to produce an intermediate image for the initial iteration, wherein the rendering comprises computing, from the plurality of photon beams, an estimated radiance for each of a plurality of rays with respect to a camera viewpoint, and wherein computing an estimated radiance of a ray from the plurality of photon beams includes calculating a volumetric radiance associated with an intersection of the ray with a photon beam; and (c) for each of one or more additional iterations, repeating steps (a)-(b) to produce a plurality of intermediate images, wherein each of the one or more additional iterations involves selection of a radius for at least one of the plurality of photon beams that is different from a radius selected for the at least one of the plurality of photon beams for the initial iteration; and (d) accumulating corresponding pixel values from at least two produced intermediate images to generate the resulting image of the scene.

2. The computer-implemented method of claim 1, wherein the radius selected for each photon beam in an iteration is equal to a constant radius value.

3. The computer-implemented method of claim 2, wherein a radius of a photon beam of the plurality of photon beams is selected by setting a kernel width of the photon beam.

4. The computer-implemented method of claim 2, wherein the constant radius value is varied by strictly decreasing the constant radius value between each iteration.

5. The computer-implemented method of claim 4, wherein strictly decreasing is decreasing the constant radius value by a constant ratio between adjacent iterations.

6. The computer-implemented method of claim 1, wherein accumulating corresponding pixel values comprises averaging the pixel values.

7. The computer-implemented method of claim 6, further comprising storing, in a computer-readable storage media, a representation of computed average estimated radiance values at each pixel in the resulting image of the scene.

8. The computer-implemented method of claim 1, further comprising discarding an intermediate image after the pixel values of the intermediate image are accumulated.

9. The computer-implemented method of claim 1, further comprising discarding the rendered photon beams after each iteration.

10. The computer-implemented method of claim 1, wherein performing a photon simulation comprises performing a shadow-mapping operation, a rasterization operation, a ray-marching operation, and/or a ray-tracing operation.

11. The computer-implemented method of claim 1, wherein performing a photon simulation comprises calculating an interaction of the plurality of photon beams with geometry and participating media in the scene.

12. The computer-implemented method of claim 1, wherein rendering the plurality of photon beams comprises performing a splatting operation, a ray-tracing operation, a ray-marching operation, and/or a rasterization operation.

13. The computer-implemented method of claim 1, wherein rendering the plurality of photon beams comprises determining a contribution of the plurality of photon beams to illumination of one or more pixels in the scene based on a progressive deep shadow map.

14. The computer-implemented method of claim 1, further comprising determining different radii for the one or more additional iterations, wherein determining the different radii comprises decreasing a kernel width of each of the plurality of photon beams.

15. The computer-implemented method of claim 1, further comprising:

for each additional iteration after the initial iteration:
identifying a respective global radius scaling factor greater than 0 and less than 1; and
determining the radius of each photon beam of the additional iteration by multiplying the radius of the photon beam of a prior iteration by the respective global radius scaling factor.

16. The computer-implemented method of claim 15, wherein the respective global radius scaling factor for each additional iteration is determined by $$R_{i+1}/R_i = \frac{i+\alpha}{i+1},$$

where i+1 is the index of the current iteration, i is the index of the prior iteration, $R_{i+1}$ is the radius of a photon beam on the additional iteration, $R_i$ is the radius of the photon beam of the prior iteration, and $\alpha$ is a constant with value greater than 0 and less than 1.

17. A rendering system for iteratively rendering a resulting image of a scene from a plurality of intermediate images, wherein the scene comprises a volumetric medium wherein the volumetric medium and lighting of such volumetric medium and scene is represented by electronically readable representative data, the system comprising:

one or more processors associated with one or more computer systems; and a memory configured to store a set of instructions to be executed by the one or more processors, the set of instructions comprising:

(a) instructions to perform for an initial iteration a photon beam simulation resulting in a representation of a plurality of photon beams in the scene, wherein performance of the photon beam simulation includes selecting a radius for each of the plurality of photon beams;

(b) instructions to render the plurality of photon beams to produce an intermediate image for the initial iteration, wherein rendering comprises computing, from the plurality of photon beams, an estimated radiance for each of a plurality of rays with respect to a camera viewpoint, and wherein computing an estimated radiance of a ray from the plurality of photon beams includes calculating a volumetric radiance associated with an intersection of the ray with a photon beam; and (c) instructions to execute instructions (a)-(b) for each of one or more additional iterations, to produce a plurality of intermediate images, wherein each of the one or more additional iterations involves selection of a radius for at least one of the plurality of photon beams that is different from a radius selected for the at least one of the plurality of photon beams for the initial iteration; and (d) instructions to accumulate corresponding pixel values from at least two produced intermediate images to generate the resulting image of the scene.

18. The rendering system of claim 17, wherein the radius selected for each photon beam in an iteration is equal to a constant radius value.

19. The rendering system of claim 18, wherein a radius of a photon beam of the plurality of photon beams is selected by setting a kernel width of the photon beam.

20. The rendering system of claim 18, wherein the constant radius value is varied by strictly decreasing the constant radius value between each iteration.

21. The rendering system of claim 20, wherein strictly decreasing is decreasing the constant radius value by a constant ratio between adjacent iterations.

22. The rendering system of claim 17, wherein accumulating corresponding pixel values comprises averaging the pixel values.

23. The rendering system of claim 22, further comprising a computer-readable storage media and instructions in the memory to store in the computer-readable storage media a representation of computed average estimated radiance values at each pixel in the resulting image of the scene.

24. The rendering system of claim 17, further comprising discarding an intermediate image after the pixel values of the intermediate image are accumulated.

25. The rendering system of claim 17, wherein performing a photon simulation comprises performing a shadow-mapping operation, a rasterization operation, a ray-marching operation, and/or a ray-tracing operation.

26. The rendering system of claim 17, wherein performing a photon simulation comprises calculating an interaction of the plurality of photon beams with geometry and participating media in the scene.

27. The rendering system of claim 17, wherein rendering the plurality of photon beams comprises performing a splatting operation, a ray-tracing operation, a ray-marching operation, and/or a rasterization operation.

28. The rendering system of claim 17, wherein rendering the plurality of photon beams comprises determining a contribution of the plurality of photon beams to illumination of one or more pixels in the scene based on a progressive deep shadow map.

29. The rendering system of claim 17, further comprising:
instructions to identify for each additional iteration after the initial iteration a respective global radius scaling factor less than 1; and
instructions to determine the radius of each photon beam of the additional iteration by multiplying the radius of the photon beam of a prior iteration by the global radius scaling factor.

30. The rendering system of claim 29, wherein the respective global radius scaling factor for each additional iteration is determined by $$R_{i+1}/R_i = \frac{i+\alpha}{i+1},$$

where i+1 is the index of the additional iteration, i is the index of the prior iteration, $R_{i+1}$ is the radius of a photon beam on the additional iteration, $R_i$ is the radius of the photon beam of the prior iteration, and $\alpha$ is a constant with value greater than 0 and less than 1.

* * * * *